(12) United States Patent
Kornfield et al.

(10) Patent No.: US 8,956,705 B2
(45) Date of Patent: Feb. 17, 2015

(54) FERROELECTRIC LIQUID CRYSTAL (FLC) POLYMERS

(75) Inventors: Julia A. Kornfield, Pasadena, CA (US);
Michael Wand, Boulder, CO (US);
Zuleikha Kurji, Pasadena, CA (US)

(73) Assignees: California Institute of Technology,
Pasadena, CA (US); LC Vision, LLC,
Boulder, CO (US)

( * ) Notice: Subject to any disclaimer, the term of this patent is extended or adjusted under 35 U.S.C. 154(b) by 874 days.

(21) Appl. No.: 12/695,338

(22) Filed: Jan. 28, 2010

(65) Prior Publication Data

US 2010/0220279 A1    Sep. 2, 2010

Related U.S. Application Data

(60) Provisional application No. 61/148,907, filed on Jan. 30, 2009.

(51) Int. Cl.

| | | |
|---|---|---|
| C09K 19/38 | (2006.01) | |
| C09K 19/20 | (2006.01) | |
| C09K 19/30 | (2006.01) | |
| C09K 19/32 | (2006.01) | |
| C09K 19/34 | (2006.01) | |
| C09K 19/12 | (2006.01) | |
| C09K 19/54 | (2006.01) | |
| G02F 1/137 | (2006.01) | |
| G02F 1/141 | (2006.01) | |
| C09K 19/02 | (2006.01) | |
| C09K 19/40 | (2006.01) | |

(52) U.S. Cl.
CPC .......... *C09K 19/0225* (2013.01); *C09K 19/3842* (2013.01); *C09K 19/406* (2013.01); *G02F 1/141* (2013.01); *G02F 1/13725* (2013.01)

USPC ..... 428/1.1; 428/1.3; 252/299.01; 252/299.5; 252/299.61; 252/299.62; 252/299.63; 252/299.66; 252/299.67

(58) Field of Classification Search
CPC .......... C09K 19/0225; C09K 19/3842; C09K 19/406; C09K 19/408; G02F 1/141; G02F 1/13725
USPC .................. 428/1.1, 1.3; 252/299.01, 299.5, 252/299.61, 299.62, 299.63, 299.66, 252/299.67; 349/172, 183
See application file for complete search history.

(56) References Cited

U.S. PATENT DOCUMENTS

| | | |
|---|---|---|
| 4,871,472 A | 10/1989 | Krause et al. |
| 4,896,292 A | 1/1990 | Eich et al. |

(Continued)

FOREIGN PATENT DOCUMENTS

| | | |
|---|---|---|
| EP | 0364538 | 5/1992 |
| EP | 0501409 | 9/1992 |

(Continued)

OTHER PUBLICATIONS

English abstract for JP 04281425, 1992.*

(Continued)

*Primary Examiner* — Shean C Wu
(74) *Attorney, Agent, or Firm* — Lathrop & Gage LLP

(57) ABSTRACT

A system having a ferroelectric liquid host material and a small amount of polymer additive is provided. In an embodiment, the polymer additive improves the physical characteristics of the system. In an embodiment, the system can be used in FLC applications.

16 Claims, 11 Drawing Sheets

(56) References Cited

U.S. PATENT DOCUMENTS

| | | | |
|---|---|---|---|
| 4,904,066 A | 2/1990 | Gray et al. | |
| 5,138,010 A | 8/1992 | Keller et al. | |
| 5,200,108 A | 4/1993 | Yuasa et al. | |
| 5,313,320 A | 5/1994 | Kornfield et al. | |
| 5,321,533 A | 6/1994 | Kumar | |
| 5,321,534 A | 6/1994 | Takatoh et al. | |
| 5,397,503 A | 3/1995 | Yuasa et al. | |
| 5,422,036 A | 6/1995 | Kawakami et al. | |
| 5,437,816 A | 8/1995 | Endo et al. | |
| 5,455,697 A * | 10/1995 | Coles et al. | 252/299.01 |
| 5,498,450 A | 3/1996 | Akashi et al. | |
| 5,540,858 A | 7/1996 | Yoshinaga et al. | |
| 5,635,106 A | 6/1997 | Basturk et al. | |
| 5,686,017 A | 11/1997 | Kobayashi et al. | |
| 5,812,227 A | 9/1998 | Toshida et al. | |
| 5,843,332 A | 12/1998 | Takeuchi et al. | |
| 6,128,056 A | 10/2000 | Kubota et al. | |
| 6,132,819 A | 10/2000 | Ober et al. | |
| 6,133,975 A | 10/2000 | Li et al. | |
| 6,157,425 A | 12/2000 | Kuo et al. | |
| 6,175,399 B1 | 1/2001 | Mitsui et al. | |
| 6,270,691 B2 | 8/2001 | Park et al. | |
| 6,452,650 B1 | 9/2002 | Nakao et al. | |
| 6,583,838 B1 | 6/2003 | Hoke et al. | |
| 6,821,455 B2 | 11/2004 | Kornfield et al. | |
| 7,008,675 B2 | 3/2006 | Kornfield et al. | |
| 7,179,509 B2 | 2/2007 | Kornfield et al. | |
| 8,834,742 B2 * | 9/2014 | Kornfield et al. | 252/299.5 |
| 2002/0001052 A1 | 1/2002 | Kornfield et al. | |
| 2004/0142117 A1* | 7/2004 | Kornfield et al. | 428/1.1 |
| 2007/0026164 A1 | 2/2007 | Murata et al. | |
| 2010/0015363 A1 | 1/2010 | Chiang et al. | |

FOREIGN PATENT DOCUMENTS

| | | |
|---|---|---|
| EP | 0562431 | 9/1993 |
| EP | 0703287 | 3/1996 |
| EP | 0903392 | 3/1999 |
| GB | 2 274 652 | 8/1994 |
| JP | 63301204 | 12/1988 |
| JP | 02116824 | 5/1990 |
| JP | 04281425 A * | 10/1992 |
| JP | 3229423 | 9/1994 |
| WO | WO 89/08633 | 9/1989 |
| WO | WO 94/23496 | 10/1994 |
| WO | WO 99/32576 | 7/1999 |
| WO | WO 01/77255 | 10/2001 |
| WO | WO 2010/088333 | 8/2010 |
| WO | WO 2012/016130 | 2/2012 |

OTHER PUBLICATIONS

Ajlun, C, (2000) "Stamp-Sized Ferroelectric LCD Can Power 50-in. TV Screens" *Electronic Design* 48:26.

Baek et al. (2009) "Fast Switching of Vertical Alignment Liquid Crystal Cells with Liquid Crystalline Polymer Networks," JP J Applied Physics 48:056507-1-056507-5.

Bremer et al. (2005) "1,1,6,7-Tetrafluoroindanes: improved liquid crystals for LCD-TV application," New J Chem 29:72-74.

Cerolaza et al. (2011) An Optical Method for Pretilt and Profile Determination in LCOS VAN Displays, J. Display Technol. 7:141-150.

David et al. (2008) "Facile, efficient Routes to Diverse Protected Thiols and to their Deprotection and Addition to Create Functional Polymers by Thiol-ene Coupling," Macromolecules 41(4):1151-1161.

Fujikake et al. (1999) "Rigid Formation of Aligned Polymer Fiber Network in Ferroelectric Liquid Crystal," *Jpn. J. Appl. Phys.* 38(1):5212-5213.

Hanaoka et al. (2004) "A new MVA-LCD by polymer sustained alignment technology," *Proc. SID*, 40.1:1200-1203.

Hardouin et al. 1992) "Small angle neutron scattering experiments on "side-on fixed" liquid crystal polysiloxanes," J. Phys. II France 2 (3):271-278.

Huang et al. (2007) "Effects of curing conditions on electrooptical properties of polymer-stabilized liquid crystal pi cells," *Jpn. J. Appl. Phys.* 46:5230-5232.

Huang et al. (2008) "Switching of Polymer-Stabilized Vertical Alignment Liquid Crystal Cell," Optics Express16(6):3859-3864.

Huang et al. (2009) "Switching of Polymer-Stabilized Vertical Alignment Liquid Crystal Pi Cell-Curing Voltage and Driving Scheme Effects," Japanese Journal of Applied Physics 48:020210-1-020210-3.

International Preliminary Report on Patentability, International Application No. PCT/US2010/022329, Aug. 2, 2011, 5 pages.

International Search Report, International Application No. PCT/US2010/022329, Nov. 16, 2010, 3 pages.

International Search Report, International Application No. PCT/US2011/045871, Mar. 23, 2012, 3 pages.

Kelly et al. (2000) "Liquid Crystal for Electro Optic Applications," In; *Handbook of Advanced Electronic and Photonic Materials and Devices*, CH. 1, Nalwa, H.S. Ed., vol. 7: *Liquid Crystals, Display and Laser* Materials,Academic Press, pp. 1-66.

Kempe et al. (Mar. 2003) "Shear Alignment Behavior of Nematic Solutions Induced by Ultralong Side-Group Liquid Crystal Polymers," *Phys. Rev. Lett.* 90(11):115501.

Kempe et al. (2004) "Chain Anisotropy of Side-Group Liquid Crystalline Polymers in Nematic Solvents," Macromolecules 37:8730-8738.

Kempe et al. (Mar. 2004) "Self-Assembled Liquid-Crystalline Gels Designed from the Bottom Up," *Nature Materials* 3:177-182.

Kim (2005) "Short Pitch Cholesteric Electro-Optical Device Stabilized by nonunifirm Polymer Network," *Appl. Phys. Lett.* 86:161118.

Klasen et al. (2000) "New Liquid-Crystal Materials for active matrix displays with negative dielectric anisotropy and low rotational viscosity," *Jpn J Appl Phys* 39(11B): L1180-1182.

S. H. Lee et al. (2009) "Emerging vertical-alignment LC technology using UV curable monomer," Journal of the SID 2009, 551.

Lee et al. (1994) "Fast Linear Electro-Optical Switching Properties of Polymer-Dispersed Ferroelectric Liquid Crystals," *Applied Physics Letters* 64(6)718-720.

E. Lueder, *Liquid Crystal Displays, Addressing Schemes and Electro-optical Effects* John Wiley and Sons, Singapore, 2001.

Marčelja, S. (1974) "Chain Ordering in Liquid Crystals. I. Even-Odd Effect" *J. Chem. Phys.* 60(9):3599.

Masahito et al. (1996) "Response mechanism of nematic liquid crystals using the in-plane switching mode," Appl. Phys. Lett. 69(5):623-625.

Mattoussi et al. (1987) "Nematic Solutions of Side Chain Nematic Polymers: A Viscoelastic Study," Molecular Crystals & Liquid Crystals 144(5):211-224.

Mattoussi et al. (1989) "Frank Elastic Constants and Rotational Viscosity for Nematic Solutions of Main-Chain Polymers," Journal de Physiqud 50(1):99-109.

McConnell et al. (1997) "Melting of Ordered Arrays and Shape Transitions in Highly Concentrated Diblock Copolymer Solutions," *Macromolecules* 30:435.

Murashige et al. (2007) "Polymer Alignment Behavior with Molecular Switching of Ferroelectric Liquid Crystal," *Jp. J. Appl. Phys.* 46(2):L37-L39.

Ono et al. (1999) "High-performance Photorefractivity in High- and Low-Molar-Mass Liquid Crystal Mixtures," J Applied Physics 85(5):2482-2487.

Palffy-Muhoray et al. (Mar. 2004) "Liquid-Crystal Gels Bridging the Experiment-Theory Gap," *Nature Materials* 4:139-140.

Park et al. (2006) "Influence of 4-Cyano4'-biphenylcarboxylic Acid on the Orientational Ordering of Cyanobiphenyl Liquid Crystals at Chemically Functionalized Surfaces," *J. Colloid and Interface Sciences* 304:459-473.

Reiffenrath et al. (1989) "New liquid-crystalline compounds with negative dielectric anisotropy," Liq. Cryst. 5(1):159-170.

Rieker et al. (Dec. 7, 1987) "'Chevron' Local Layer Structure in Surface-Stabilized Ferroelectric Smectic-C Cells," *Phys. Rev. Lett.* 59:2658-2661.

Shimada et al. (1991) "Electro-Optic Bistability of Ferroelectric Liquid Crystal Cell Prepared Using Obliquely Evaporated Sio Films," *Mol. Cryst. Liq. Cryst.* 201:133.

(56) References Cited

OTHER PUBLICATIONS

Sweta Dash, *iSuppli*, Jan. 29, 2010 [http://www.isuppli.com/Display-Materials-and-Systems/News/Pages/LCD-TV-Panel-Market-Returns-to-Growth-in-2010.aspx].

Takahashi et al. (2003) "Dynamic Local-Layer Response of Surface-Stabilized Ferroelectric Liquid Crystals to a High Electric Field by Time-Resolved X-Ray Microdiffraction," *Phys. Rev. E* 67:051706.

Verduzco et al. (2007) "Director Dynamics in Liquid-Crystal Physical Gels," Soft Matter 3(8):993-1002.

S. T. Wu and D. K. Yang, *Reflective Liquid Crystal Displays*, John Wiley and Sons, Singapore, 2001.

Xia et al. (2009) "Efficient Synthesis of Narrowly Dispersed Brush Copolymers and Study of Their Assemblies: The Importance of Side Chain Arrangement," *J. Am. Chem. Soc.* 131:18525-18532.

Yao et al. (1997) "Electrorheological Behavior of Side-Chain Liquid-Crystalline Polysiloxanes in Nematic Solvents," Macromolecules 30(19):5822-5831.

Zhao et al. (2006) "Conformation of Comb-Like Liquid Crystal Polymers in Isotropic Solution Probed by Small-Angle Neutron Scattering," *J. Polym.Sci. B Polym. Phys.* 44(17):2412-2424.

First Office Action issued on Feb. 27, 2013, from the State Intellectual Property Office of China for corresponding Chinese Application No. 201080011736.9.

Second Office Action issued on Nov. 26, 2013, from the State Intellectual Property Office of China for corresponding Chinese Application No. 201080011736.9.

Third Office Action issued on Aug. 8, 2014, from the State Intellectual Property Office of China for corresponding Chinese Application No. 201080011736.9 and English summary.

* cited by examiner (a) FLC alone (b) FLC + Additive (c)

(a) Current polymer

Symmetric, no dipole (b) Additional polymer

Asymmetric, has dipole ($\mu \rightarrow$)

(a)
Biphenyl side group

Phenyl pyrimidine side group

Symmetric, no net dipole ($\mu=0$)

(b)
Phenyl pyrimidine side group

Asymmetric, has dipole ($\mu \rightarrow$)

FERROELECTRIC LIQUID CRYSTAL (FLC) POLYMERS

CROSS-REFERENCE TO RELATED APPLICATIONS

This application claims priority to U.S. provisional application Ser. No. 61/148,907, filed Jan. 30, 2009 which is incorporated by reference in its entirety.

STATEMENT REGARDING FEDERALLY SPONSORED RESEARCH OF DEVELOPMENT

This invention was made with government support under STTR grant IIP-0741216, awarded by the National Science Foundation. The government has certain rights in the invention.

BACKGROUND OF THE INVENTION

The present invention relates generally to liquid crystals, and more particularly to ferroelectric liquid crystals.

Ferroelectric liquid crystals (FLCs) have the potential to displace their nematic counterparts, which currently dominate today's $83 billion dollar per year display market (1). Advantages of FLCs include much faster switching speeds, dramatically lower power consumption and superior resolution relative to nematic LCDs.

The spontaneous molecular polarization of FLCs, arising from their structure when constrained in small cell gaps, results in unique features that can be exploited in display devices. In this confinement, a low electric field of only a few volts can switch the FLC between two equally stable states with opposing polarization directions (FIG. 2b). This is commonly referred to as bistability. In contrast, nematic displays generally require the electric field to maintain the "ON" state. The power required to run FLC displays is consequently much less than that required for a nematic display. Since active switching is used in both directions, FLCs can switch hundreds of times faster than a nematic display, which can only be driven actively in one direction (and passively relax into their "OFF" state over tens of milliseconds).

FLCs also show high resolution due to the very thin gaps allowed by their mode of action. In the transmission mode, they are typically less than 2 μm thick, compared to 4 to 8 μm in nematic LCDs. In reflective FLC displays, this thickness is reduced by half, resulting in a thickness of less than 1 μm. Thus, pixels as small as 5 μm have been demonstrated. Another advantage of FLCs is the 180 degree viewing angle (available because the molecules switch in the same plane as the screen, not in and out of that plane, like nematic displays).

Most of the difficulties in manufacturing FLC displays can be traced to control of their nanostructure inside the devices. The molecules spontaneously organize into layers (a smectic phase). That is not enough to make them ferroelectric, however. The long axis of the molecules must have a preferred tilt relative to the layer normal (FIG. 2c): if the long axis of the molecules simply points along the layer normal, there is no spontaneous dipole in the plane of the layers. Tilt alone is still not enough to make a ferroelectric: they must also be chiral, so that the molecules are capable of discriminating between two different tilted states that have opposite direction of the dipole in the plane of the layers. But having a dipole component in the layer is again not enough to give a macroscopically ferroelectric material: forcing adjacent layers to point their dipoles in the same direction costs free energy, so the system tends to adopt a "spiral staircase" arrangement of the dipoles, resulting in no macroscopic dipole. To persuade the layers to conform to a single, uniform orientation of their dipoles requires the confinement to a thin gap, so that surface effects are as important as bulk effects. By tailoring the surfaces so that the molecules have a strong incentive to lie parallel to the walls of the cell, two distinct orientations can be favored over all others (eliminating most of the stairs in the "spiral staircase" so that the dipoles no longer have the option of cancelling each other out). That insight is famous in the world of liquid crystals: the concept of a "surface stabilized ferroelectric liquid crystal" (SSFLC) is due to Noel Clark and Sven Lagerwall in 1980. Over 20 years has elapsed since the seminal discoveries regarding SSFLCs were made, leading to the current renaissance of the field as more and more IP comes off patent. The ideal FLC display layer structure is, thus, the "bookshelf geometry," where the layers are orthogonal to walls of the cell and the molecules in the layers are, on average, oriented parallel to the walls of the cell (FIG. 2a); the LC director is then forced to align parallel to the surface, in one of two discrete orientations that satisfy its required tilt relative to the layer normal (FIGS. 2b and c). A consequence of perfect bookshelf alignment is that an electric field can be used to "pop" the director orientation into one or the other of the two "allowed" orientations; after the field is removed, the director does not reorient (FIG. 2c), so it is stable when voltage stops being applied. Soon after the discovery of SSFLC, however, it was realized that it is no simple matter to achieve the "bookshelf geometry."

In practice, FLC layers are often oriented in chevrons, with two types of layers that tilt symmetrically away from the bookshelf orientation (4) (FIG. 3). This is a serious problem for FLC devices, because without bookshelf geometry, it is difficult to obtain bistability. Indeed, the few FLC devices on the market today are not bistable, and use a continuously imposed electric field to hold the molecules in a chosen optic axis state, eliminating one of the great advantages of FLCs—low power consumption (5). Zigzag defects are a visible manifestation of the formation of chevron layer structure: the boundaries of domains with different chevron directions result in "leakage of light"—bright lines when the FLC cell is viewed through crossed polarizers (FIG. 1). Such optical defects render a device useless as a display. In an attempt to solve the foregoing problems, much effort has been expended.

One such approach is to use obliquely deposited amorphous silicon as an alignment layer that forces the layers into bookshelf geometry. Unfortunately, since the silicon must be deposited in a vacuum chamber, this method is expensive and difficult to generalize to many types of cell configurations. Another method involves applying a high voltage, low frequency electric field across a cell that has the undesired "chevron geometry" to induce quasi-bookshelf geometry, but these cells have slower switching speeds than the same cell with chevron geometry. Since the quasi-bookshelf geometry is not thermodynamically induced, the alignment is lost if the cell is heated into another LC phase.

In-situ polymerization in a FLC host is another approach described in the literature (6, 7, 8). In this approach, reactive or ionic species for polymerization are present when the LC is loaded in the cell and a subsequent UV irradiation step is required to polymerize the species (with its concomitant damage of organic materials in the device). In other approaches, the polymer forms a separate phase from the host, reducing the optical uniformity of the LC layer. In addition to the disadvantages mentioned, the previous attempts adversely affected the operating voltage and switching speed. Commercialization of an approach involving in situ polymerization has not been forthcoming despite many years of effort.

BRIEF SUMMARY OF THE INVENTION

Generally provided is a system comprising a conventional ferroelectric liquid crystal ("FLC") host material and a small amount of a polymer additive. More specifically, the polymer additive is a side group liquid crystal polymer as described further herein. The polymer additive is present in the FLC host in small amounts (between 0.01 and 5 wt % in embodiments). In an embodiment, one or more polystyrene end groups are chemically bound to the side group liquid crystal polymer. In an embodiment, no polystyrene end groups are chemically bound to the side group liquid crystal polymer. The words "polymer additive", "dopant" and "side group liquid crystal polymer" and other variations of the phrases are used interchangeably herein. The ferroelectric liquid crystal host and side group liquid crystal polymer together are a "ferroelectric liquid crystal composition" as used herein.

Although applicant does not wish to be bound by theory, it is believed that the polymer additive is soluble in the FLC host and undergoes the change in orientation order along with the FLC host upon processing, and resists the shearing deformation that occurs as chevrons form. The polymer additive can contain any polymer, spacer and liquid crystal or other groups which produce the desired effect upon introduction into the FLC host. Some specific examples of the polymer, spacer and liquid crystal useful in the side group liquid crystal polymer are shown and described herein. In an aspect of the invention, the side group liquid crystal polymer is polymerized and then added to the FLC host. In an aspect of the invention, the switching speed of the FLC host including the polymer additive is as fast (within 5%) or faster than the switching speed of the FLC host without the polymer additive. In an embodiment, the FLC compositions described herein exhibit bistable switching. In an embodiment, the optical rise time of the FLC composition including the polymer additive is approximately equal to (within 5%) or less than the optical rise time of the FLC host without the polymer additive. In an aspect of the invention, the addition of the polymer additive to the FLC host improves the contrast of the mixture in a cell or device. In an aspect of the invention, the addition of the polymer additive to the FLC host reduces defects of the FLC composition in a cell or device, of which zig-zag defects are one example. In an aspect of the invention, response speed of devices containing the FLC compositions described herein is improved as compared to the response speed of devices which do not contain the polymer additive, as described herein. In an aspect of the invention, the FLC composition of the invention has one or more of the effects described herein.

The invention includes liquid crystal cells and devices using the FLC composition of the invention including small and large area displays and devices such as camera viewfinders and home theaters. The preparation and uses of these cells and devices are well known to one of ordinary skill in the art.

In an aspect of the invention, the polymer additives described herein do not form separate phases from the FLC host in the FLC composition. In an aspect of the invention, in the polymer additive, the polymer is linked to the liquid crystal through a thiol spacer or a siloxane spacer. The synthesis and use of these spacers is known in the art. In an aspect of the invention, the liquid crystal group used in the polymer additive does not have a dipole. In an aspect of the invention, the liquid crystal group used in the polymer additive does have a dipole.

More specifically, provided in an aspect of the invention is: a ferroelectric liquid crystal composition, comprising: a ferroelectric liquid crystal host; and between 0.01 and 5 wt % of a side group liquid crystal polymer, wherein the side group liquid crystal polymer has the structure (FX1):

(FX1)

wherein PX is a polymer; W is a spacer; and LC is a liquid crystal. In an embodiment, PX is selected from the group consisting of: polythiolene, polyamide, polyimide, polysiloxane, polyacrylate, polymethacrylate, and polybutadiene. The repeating units of these PX polymers are shown below. In an embodiment, W is a siloxane- or thiol-containing spacer. In an embodiment, LC comprises at least one portion of a group in a component of the FLC host.

In an embodiment, the side group liquid crystal polymer has the structure (FX2):

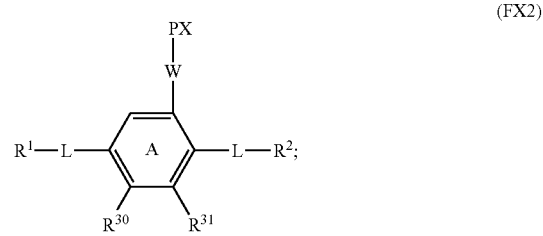

(FX2)

wherein PX is

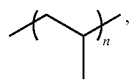

$[-(CH_2-CH-S)_n-]$, $[-(NH-CH-C(=O))_n-]$, $[-(-C(=O)-N-C(=O))_n-]$, $[-(Si(CH_2)-O)_n-]$, $[-(CH_2-CH(C(O)=O)_n-]$, $[-(CH_2-C(CH_3)(C(O)=O)_n-]$, $[-(CH_2CH)_n-]$, $[-(CH(CH_2CH_2))_n-]$ or $[-(CH_2-CH(CH_2CH_2))_n-]$ where in each PX, n is independently an integer between 50 to 10000;

W is $-(O)_b-(CR^{13}R^{14})_x-(O)_b-FX-(O)_b-(CR^{15}R^{16})_y-(O)_b-$, where x and y are each independently integers from 0 to 20;

FX is a spacer selected from $-S-$, $-S(=O)-$, $-O-$, $-C(=O)-$,

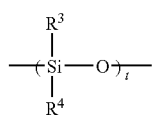

and

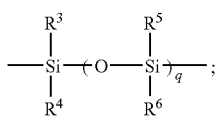

where q is an integer from 0 to 10; t is an integer from 1 to 10; each b is independently 0 or 1; and $R^3$, $R^4$, $R^5$ and $R^6$ are each independently selected from optionally substituted $C_1$-$C_6$ alkyl, where the optional substituents are one or more halogens; $R^{13}$, $R^{14}$, $R^{15}$ and $R^{16}$ are each independently hydrogen or halogen; each L is independently selected from: —O—C(=O)—, —C(=O)—O—, —C=C—, —C≡C—, —(CH$_2$)$_u$—; and a single bond; where u is an integer from 1 to 10;
$R^1$ and $R^2$ are each independently selected from:

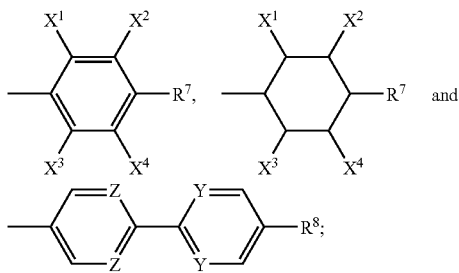

where $X^1$, $X^2$, $X^3$ and $X^4$ are independently hydrogen, halogen, methoxy, $C_1$-$C_3$ alkyl or —CN; where (a) each Z and each Y is CH, or (b) each Z is N and each Y is CH, or (c) each Y is N and each Z is CH;
$R^7$ and $R^8$ are each independently hydrogen, halogen, and —(O)$_v$—(CH$_2$)$_p$—CH$_3$ where p is an integer from 0 to 20 and v is 0 or 1;
$R^{30}$ and $R^{31}$ are each independently hydrogen or halogen. In each PX described herein, a suitable terminating group is included. This group is not explicitly shown in all instances, but is standard in the art.

In an embodiment, any ring in LC can include one or more optional heteroatoms replacing C in the ring. In an embodiment, any ring in LC can include one or more optional substituents including halogen, C1-C6 alkyl, C1-C6 alkoxy and other substituents described herein and known in the art. In an embodiment, LC can contain one or more fused rings. In an embodiment, LC can contain one or more fused five- or six-membered rings or a combination thereof.

In an embodiment, in the side group liquid crystal polymer, PX is a polymer having the formula:

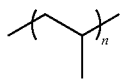

where n is an integer from 50 to 10,000. In an embodiment, in the side group liquid crystal polymer, PX is a polymer having the formula: [—(CH$_2$—CH—S)$_n$—], where n is an integer from 50 to 10,000. In an embodiment, in the side group liquid crystal polymer, PX is a polymer having the formula: [—(NH—CH—C(=O))$_n$—], where n is an integer from 50 to 10,000. In an embodiment, in the side group liquid crystal polymer, PX is a polymer having the formula: [—(—C(=O)—N—C(=O))$_n$—] where n is an integer from 50 to 10,000. In an embodiment, in the side group liquid crystal polymer, PX is a polymer having the formula: [—(Si(CH$_2$)—O)$_n$—], where n is an integer from 50 to 10,000. In an embodiment, in the side group liquid crystal polymer, PX is a polymer having the formula: [—(CH$_2$—CH(C(O)=O)$_n$—], where n is an integer from 50 to 10,000. In an embodiment, in the side group liquid crystal polymer, PX is a polymer having the formula: [—(CH$_2$—C(CH$_3$)(C(O)=O)$_n$—] where n is an integer from 50 to 10,000. In an embodiment, in the side group liquid crystal polymer, PX is a polymer having the formula: [—(CH$_2$—CH(CH$_2$CH$_2$))$_n$—] where n is an integer from 50 to 10,000. In an embodiment, in the side group liquid crystal polymer, PX is a polymer having the formula: [—(CH$_2$CH)$_n$—], where n is an integer from 50 to 10,000. In an embodiment, in the side group liquid crystal polymer, PX is a polymer having the formula: [—(CH(CH$_2$CH$_2$))—$_n$], where n is an integer from 50 to 10,000.

In an embodiment, in any of the possibilities for PX, n is an integer from 100 to 5,000. In an embodiment, in any of the possibilities for PX, n is an integer from 500 to 1,000.

In an embodiment, in the side group liquid crystal polymer each L is independently selected from the group consisting of: —O—C(=O)—, —C(=O)—O—, —(CH$_2$)$_u$—; and a single bond; where u is an integer from 1 to 10; W is —(CH$_2$)$_x$—FX—(CH$_2$)$_y$—; x and y are each independently integers from 0 to 20;
FX is a spacer selected from —S—,

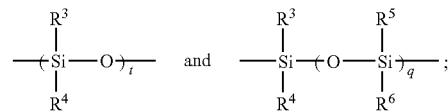

where q is an integer from 0 to 10;
where t is an integer from 1 to 10;
$R^3$, $R^4$, $R^5$ and $R^6$ are each independently selected from hydrogen and $C_1$-$C_6$ alkyl;
PX is a polymer having the structure:

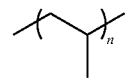

where n is an integer from 50 to 10,000;
$R^1$ and $R^2$ are each independently selected from:

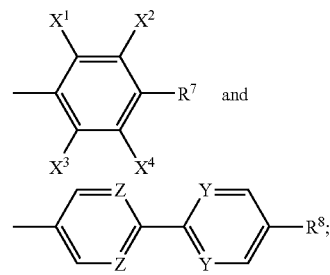

where $X^1$, $X^2$, $X^3$ and $X^4$ are independently hydrogen, halogen or —CN; where (a) each Z and each Y is CH, or (b) each Z is N and each Y is CH, or (c) each Y is N and each Z is CH;
$R^7$ and are independently —(O)$_v$—(CH$_2$)$_p$—CH$_3$ where p is an integer from 0 to 20; v is 0 or 1; and $R^{30}$ and $R^{31}$ are each independently hydrogen or halogen.

In an embodiment, in the ferroelectric liquid crystal composition the side group liquid crystal polymer has the structure (FX3):

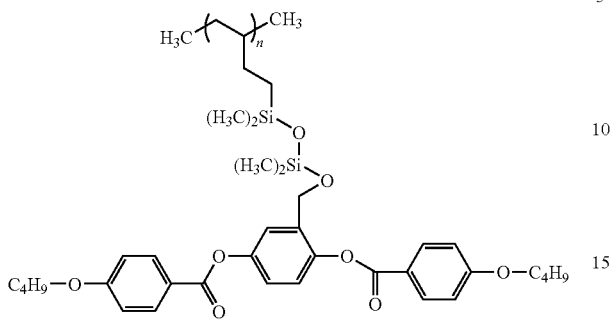

where n is an integer from 200 to 1,000.

In an embodiment, in the ferroelectric liquid crystal composition, the side group liquid crystal polymer has the structure (FX4):

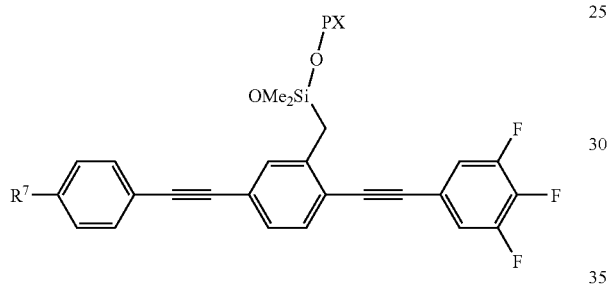

In an embodiment, in the ferroelectric liquid crystal composition, in the side group liquid crystal polymer, when L-R² is

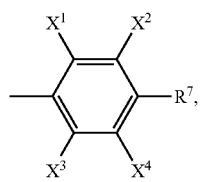

$X^3$ and $R^{11}$, along with the carbon atoms on the rings to which they are attached, form a five-membered ring, so that LC has the structure:

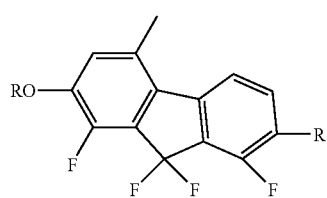

where each R is independently C1-C6 alkyl.

In an embodiment of the ferroelectric liquid crystal composition, in the side group liquid crystal polymer, LC has the structure

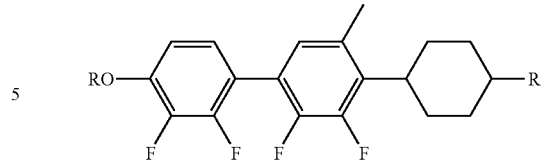

where each R is independently a C1-C6 alkyl.

In an embodiment of the ferroelectric liquid crystal composition, the side group liquid crystal polymer has the structure (FX5)-(FX8):

(FX5)

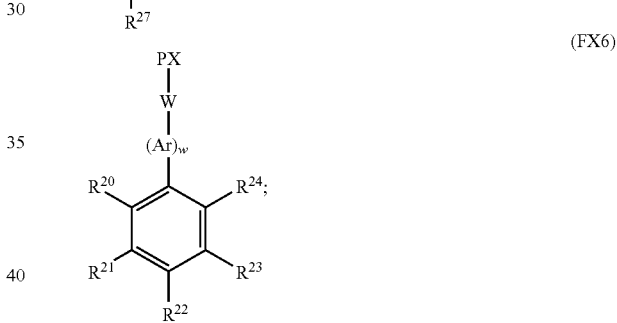

(FX6)

(FX7)

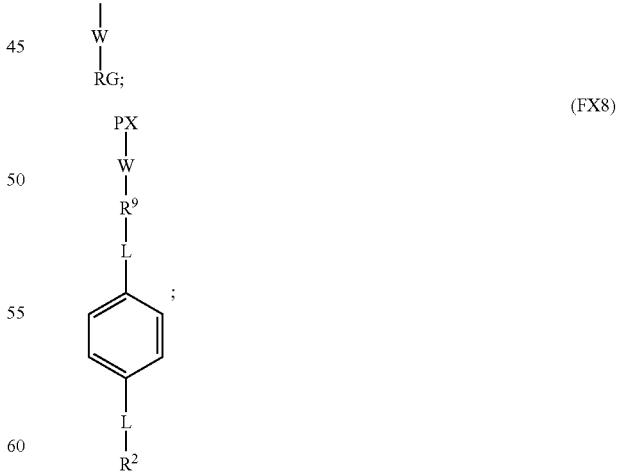

(FX8)

where Ar is selected from phenyl; pyrimidine; pyridine; and cyclohexyl having an optional O or S heteroatom in the ring; w is an integer from 0 to 3; $R^{20}$, $R^{21}$, $R^{22}$, $R^{23}$ and $R^{24}$ are each independently —H, —F, —Cl, —Br, —CN, —CF3, —OCF3, —OCH3, C1-C6 optionally substituted alkyl where the optional substituents are one or more halogens, and C1-C6 alkoxy; RG is selected from the group consisting of:

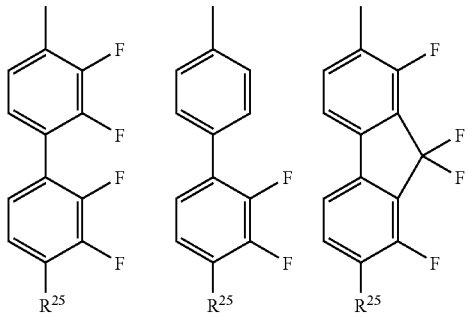

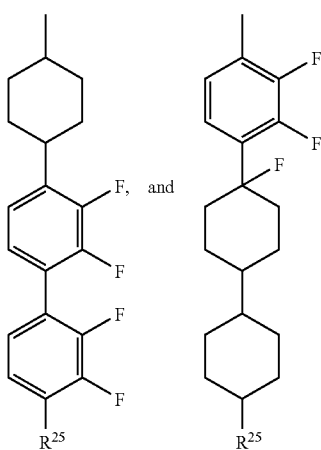

where $R^{25}$ is C1-C6 alkyl or C1-C6 alkoxy; PX is

[—CH$_2$—CH—S)$_n$—], [—(NH—CH—C(=O))$_n$—], [—(—C(=O)—N—C(=O))$_n$—], [—(Si(CH$_2$)—O)$_n$—], [—(CH$_2$—CH(C(O)=O)$_n$—], [—(CH$_2$—C(CH$_3$)(C(O)=O)$_n$—], [—(CH$_2$CH)$_n$—], [—(CH(CH$_2$CH$_2$))—$_n$] or [—(CH$_2$—CH(CH$_2$CH$_2$))$_n$—] where in each PX n is independently an integer between 50 to 10000;

W is —(O)$_b$—(CR$^{13}$R$^{14}$)$_x$—(O)$_b$—FX—(O)$_b$—(CR$^{15}$R$^{16}$)$_y$—(O)$_b$—, where x and y are each independently integers from 0 to 20;

FX is a spacer selected from —S—, —S(=O)—, —O—, —C(=O)—,

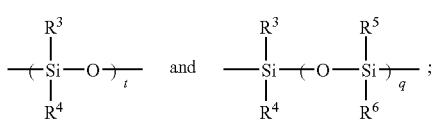

where q is an integer from 0 to 10; t is an integer from 1 to 10;

each b is independently 0 or 1; and $R^3$, $R^4$, $R^5$ and $R^6$ are each independently selected from optionally substituted $C_1$-$C_6$ alkyl, where the optional substituents are one or more halogens;

$R^{13}$, $R^{14}$, $R^{15}$ and $R^{16}$ are each independently hydrogen or halogen; $R^{27}$ is C1-C20 alkyl, C1-C20 alkoxy, halogen, hydrogen, -Q(CH$_2$)$_f$(CF$_2$)$_g$CF$_3$ or -Q(CH$_2$)$_f$(SiMe$_2$)(CH$_2$)$_g$(CF$_2$)$_g$CF$_3$; where Q is O, S, CO, CO2 or a single bond; each f and g are independently integers from 0 to 10;

each T is independently CH or N; where when T is CH, T is optionally substituted with halogen, —CF3, OCF3, —CN, —OCH3 or CH3;

$R^2$ is selected from:

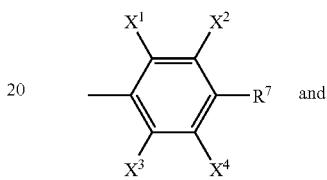 and

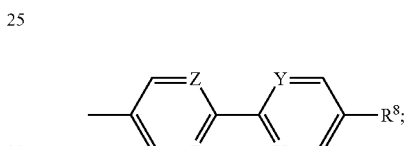

$X^1$, $X^2$, $X^3$ and $X^4$ are independently H or halogen; where (a) each Z and each Y is CH, or (b) each Z is N and each Y is CH, or (c) each Y is N and each Z is CH;

$R^7$ and $R^8$ are independently —(O)$_v$—(CH$_2$)$_p$—CH$_3$ where p is an integer from 0 to 20 and v is 0 or 1;

$R^9$ is

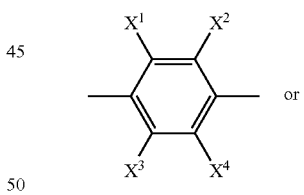 or

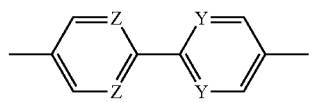

where $X^1$, $X^2$, $X^3$ and $X^4$ are independently H or halogen; where (a) each Z and each Y is CH, or (b) each Z is N and each Y is CH, or (c) each Y is N and each Z is CH; and each L is independently selected from: —O—C(=O)—, —C(=O)—O—, —C≡C—, —C≡C—, —(CH$_2$)$_u$—; and a single bond; where u is an integer from 1 to 10.

In an embodiment of the ferroelectric liquid crystal composition, the side group liquid crystal polymer has the structure (FX9), (FX10) or (FX9A):

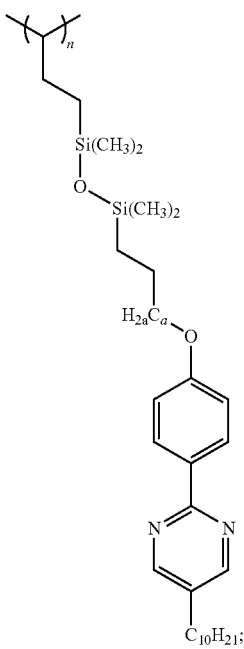

(FX9)

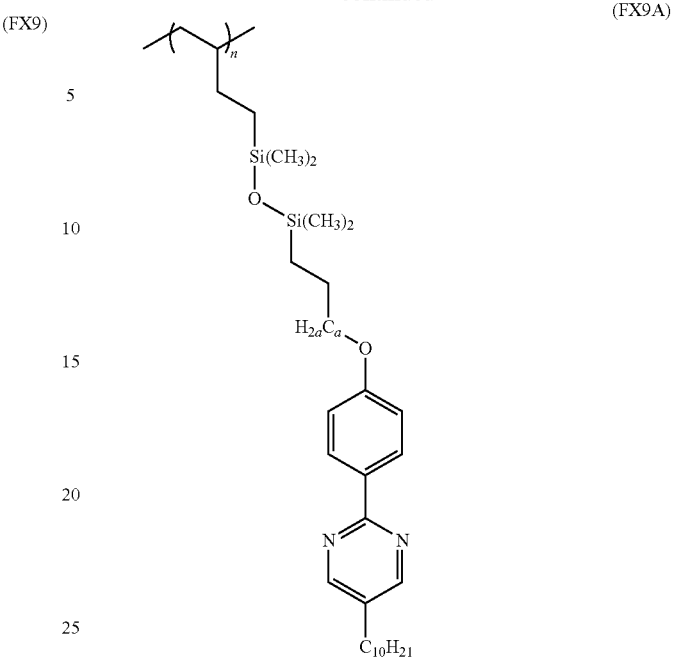

where n is an integer from 500 to 1,000 and a is an integer from 5 to 9.

In an embodiment of the ferroelectric liquid crystal composition of any of the formulas described herein, including Formulas (FX5)-(FX10), in the side-group liquid crystal polymer, PX is a polymer having the structure:

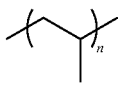

(FX10)

where n is an integer from 50 to 10,000.

In an embodiment, provided is a ferroelectric liquid crystal composition, comprising: a ferroelectric liquid crystal host; and between 0.01 and 5 wt % of a side group liquid crystal polymer, wherein the side group liquid crystal polymer has the structure (FX11):

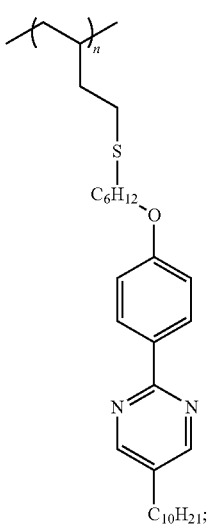

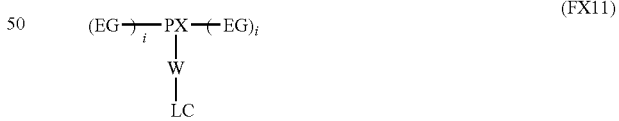

wherein PX is a polymer; W is a spacer; LC is a liquid crystal, EG is a polystyrene end group, and each i is independently 0 or 1. In this embodiment, one or more polystyrene end group polymers are included in the polymer additive. In separate embodiments of formula (FX11), each i is 0. In separate embodiments of formula (FX11), one i is 1 and one i is 0. In separate embodiments of formula (FX11), each i is 1.

In an embodiment, provided is a ferroelectric liquid crystal composition, comprising: a ferroelectric liquid crystal host; and between 0.01 and 5 wt % of a side group liquid crystal polymer, wherein the side group liquid crystal polymer has the structure (FX11A):

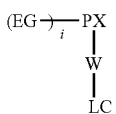

(FX11A)

where the variables are defined as above.

Also shown is a ferroelectric liquid crystal composition, wherein the side group liquid crystal polymer has the structure (FX12):

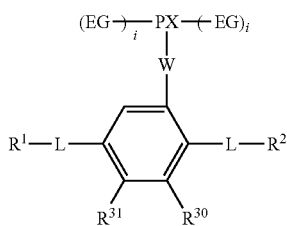

(FX12)

each i is 0 or 1;
each EG is

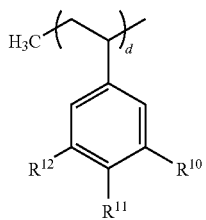

where d is independently an integer from 100 to 1000 and each $R^{10}$, $R^{11}$ and $R^{12}$ is independently hydrogen, halogen or —CN;
PX is

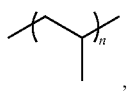

,

[—($CH_2$—CH—S)$_n$—], [—(NH—CH—C(=O))$_n$—], [—(—C(=O)—N—C(=O))$_n$—], [—(Si($CH_2$)—O)$_n$—], [—($CH_2$—CH(C(O)=O)$_n$—], [—($CH_2$—C($CH_3$)(C(O)=O)$_n$—], [—($CH_2$CH)$_n$—], [—(CH($CH_2CH_2$))—$_n$] or [—($CH_2$—CH($CH_2CH_2$))$_n$—] where in each PX n is independently an integer between 50 to 10000;
W is —(O)$_b$—($CR^{13}R^{14}$)$_x$—(O)$_b$—FX—(O)$_b$—($CR^{15}R^{16}$)$_y$—(O)$_b$—, where x and y are each independently integers from 0 to 20;
FX is a spacer selected from —S—, —S(=O)—, —O—, —C(=O)—,

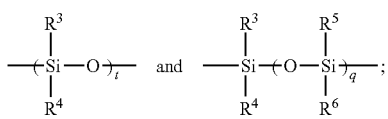

where q is an integer from 0 to 10;
t is an integer from 1 to 10; each b is independently 0 or 1; and $R^3$, $R^4$, $R^5$ and $R^6$ are each independently selected from optionally substituted $C_1$-$C_6$ alkyl, where the optional substituents are one or more halogens; $R^{13}$, $R^{14}$, $R^{15}$ and $R^{16}$ are each independently hydrogen or halogen; each L is independently selected from: —O—C(=O)—, —C(=O)—O—, —C≡C—, —($CH_2$)$_u$—; and a single bond; where u is an integer from 1 to 10;
$R^1$ and $R^2$ are each independently selected from:

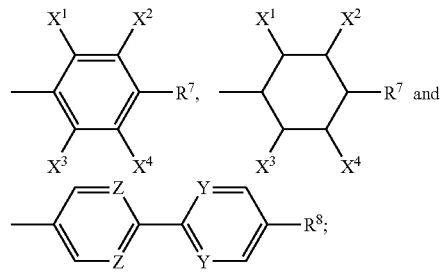

where $X^1$, $X^2$, $X^3$ and $X^4$ are independently hydrogen, halogen, methoxy, $C_1$-$C_3$ alkyl or —CN; where (a) each Z and each Y is CH, or (b) each Z is N and each Y is CH, or (c) each Y is N and each Z is CH;
$R^7$ and $R^8$ are each independently hydrogen, halogen, and —(O)$_v$—($CH_2$)$_p$—$CH_3$ where p is an integer from 0 to 20 and v is 0 or 1;
$R^{30}$ and $R^{31}$ are each independently hydrogen or halogen.

Also provided in an embodiment is a ferroelectric liquid crystal composition described herein, wherein the side group liquid crystal polymer has the structure (FX12A):

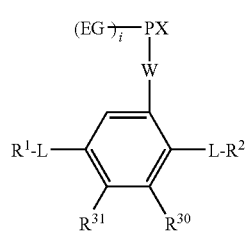

(FX12A)

where the variables are as described for formula (FX12).

As an embodiment of each formula described herein, provided is an aspect wherein in the side group liquid crystal polymer of the ferroelectric liquid crystal composition, PX is a polymer having the structure:

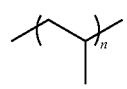

where n is an integer from 50 to 10,000.

Also shown is a ferroelectric liquid crystal composition as described herein wherein the side group liquid crystal polymer has the structure (FX13):

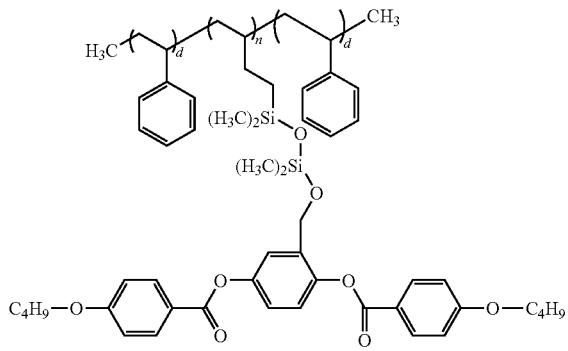

(FX13)

where each d is independently an integer from 100 to 1000; and n is an integer from 50 to 10,000. In certain aspects of the invention, this structure (FX13) and other structures having a polystyrene end group of each side of PX are used as a comparison to polymer additives having no polystyrene end groups and polymer additives having one polystyrene end group attached to PX.

Also provided in an embodiment is a ferroelectric liquid crystal composition as described herein wherein the side group liquid crystal polymer has the structure (FX14):

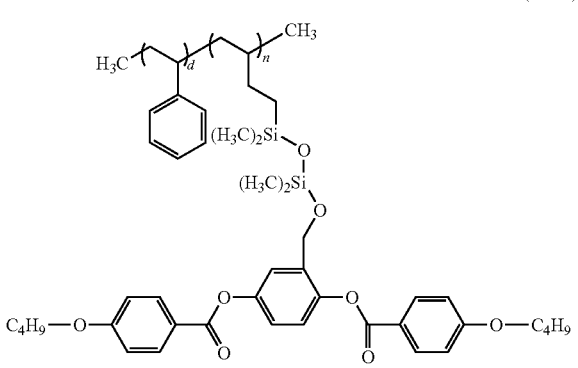

(FX14)

where d is an integer from 100 to 1000; and n is an integer from 50 to 10,000.

In an aspect of the invention, provided is a side group liquid crystal polymer additive having the structure (FX14A):

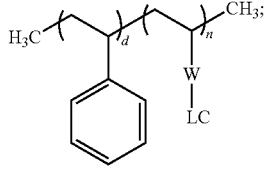

(FX14A)

where the variables are as defined for formula (FX12).

In an aspect of the invention the side group liquid crystal polymer described herein is soluble in the ferroelectric liquid crystal host at a temperature at which the ferroelectric liquid crystal host is ferroelectric. In an aspect of the invention, compounds having the structure FX2 and all other specifically identified compounds herein are described separately so as to provide support to claim these compounds separately.

Also provided in an aspect is an optical device comprising: two opposing electrode surfaces, a ferroelectric liquid crystal composition described herein disposed therebetween, wherein the optical device has improved contrast as compared to an optical device containing no side group liquid crystal polymer.

Also provided in an aspect is a method of preparing a ferroelectric liquid crystal composition, comprising: contacting a ferroelectric liquid crystal host; and between 0.01 and 5 wt % of a side group liquid crystal polymer which is soluble in the ferroelectric liquid crystal host.

In an embodiment of the invention, the side group liquid crystal polymer is present in the ferroelectric liquid crystal composition at a concentration below 1% by weight. In an embodiment of the invention, the side group liquid crystal polymer is present in the ferroelectric liquid crystal composition at a concentration below 5% by weight. In an embodiment of the invention, the side group liquid crystal polymer is present in the ferroelectric liquid crystal composition at a concentration below 0.1% by weight. In an embodiment, n in the polymer PX is an integer from 50 to 5,000. In an embodiment of the invention, the side group liquid crystal polymer has a molecular weight between 30,000 g/mol and 3,000,000 g/mol and all intermediate values and ranges therein. In an embodiment of the invention, the side group liquid crystal polymer has a molecular weight between 30,000 g/mol and 50,000 g/mol. In an embodiment of the invention, the side group liquid crystal polymer has a molecular weight between 1,000,000 g/mol and 3,000,000 g/mol.

As used herein, "soluble side group liquid crystal polymer" and other forms of the phrase means the side group liquid crystal polymer forms a homogeneous composition of host and side group liquid crystal polymer and there are not phase separated layers or portions thereof. In an aspect of the invention, the side group liquid crystal polymers of the invention are soluble side group liquid crystal polymers. At least a portion of the soluble side group liquid crystal polymer is solvated by the host at least under some temperature and concentration conditions. In the invention, the association between the side group liquid crystal polymer and host is a physical association, not chemical bonding between the side group liquid crystal polymer and host. In an aspect of the invention where there are no end groups, there is no physical crosslinking between side group liquid crystal polymer groups.

In an embodiment, the LC includes a core having one or more six membered aromatic or nonaromatic rings which can include one or more heteroatoms in the rings and one or more substituents, including alkyl, alkoxy and halogen and one or more tails, including the structures described herein and alkylsilane, perfluoroalkylsliane, and silylfluoro tails.

As used herein, any grouping of substituents or groups or other grouping is intended to allow inclusion or exclusion of one or more members of the group for any purpose, including inclusion or exclusion of one or more members of the group in the claims.

As used herein, when the side group liquid crystal polymer is "soluble" or "solvated" in the ferroelectric liquid crystal host, this means that at least a portion of the side group liquid crystal polymer is solvated by the host. In an embodiment, the liquid crystal group is soluble in the ferroelectric liquid crystal host. In an embodiment, the side group liquid crystal polymer is soluble in the ferroelectric liquid crystal host at some temperatures and not at other temperatures. In an embodiment, the side group liquid crystal polymer is reversibly soluble in the host.

As used herein, "polymer additive" comprises the backbone, the spacers and the mesogens attached to them. As used herein, a "FLC host" comprises a mixture of small molecules that form a chiral smectic phase at the temperatures of interest for a particular application. As used herein "core" refers to a central portion of a mesogen that contributes to important attributes (including but not limited to shape, size, polarizability, dipole magnitude and dipole orientation). In an embodiment, LC is a mesogen.

DETAILED DESCRIPTION OF THE INVENTION

Figure 1:
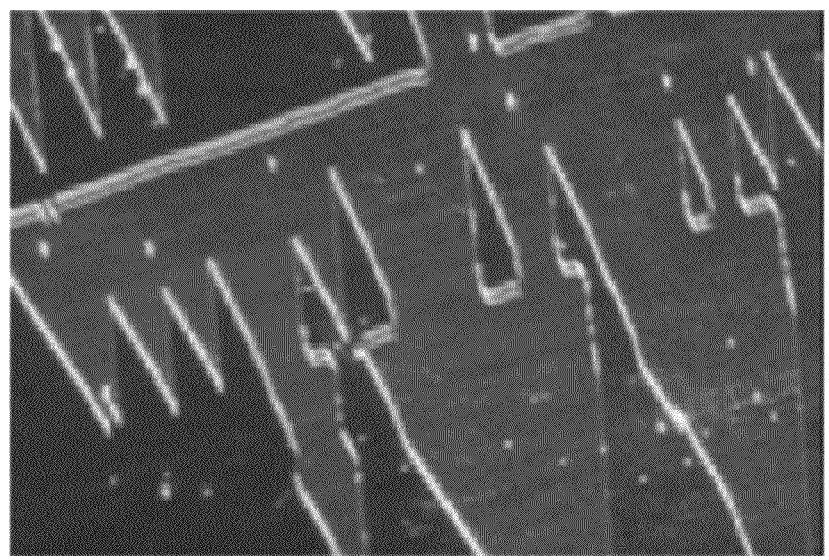
FIG. 1 shows an optical micrograph of the "zigzag defects" that often form during processing of FLC cells, diminishing the utility of the device.
Figure 2:
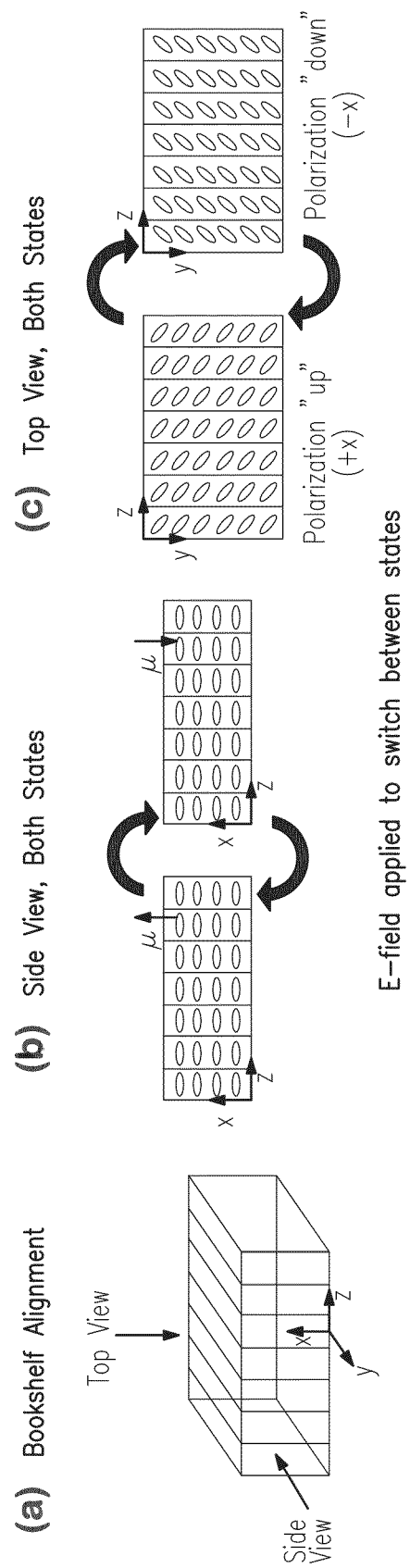
FIG. 2(a) shows the optimal alignment of smectic layers for a bistable FLC is like books on a bookshelf, (b) is a side view of the bookshelf alignment that shows that the two stable states have dipoles pointing in opposite directions, allowing a brief application of a small voltage across the cell to switch the cell from one state to the other, (c) is a top view that shows that switching reorients the optical axes in the plane of the device, giving rise to the FLC electrooptic effects that are exploited in displays.
Figure 3:
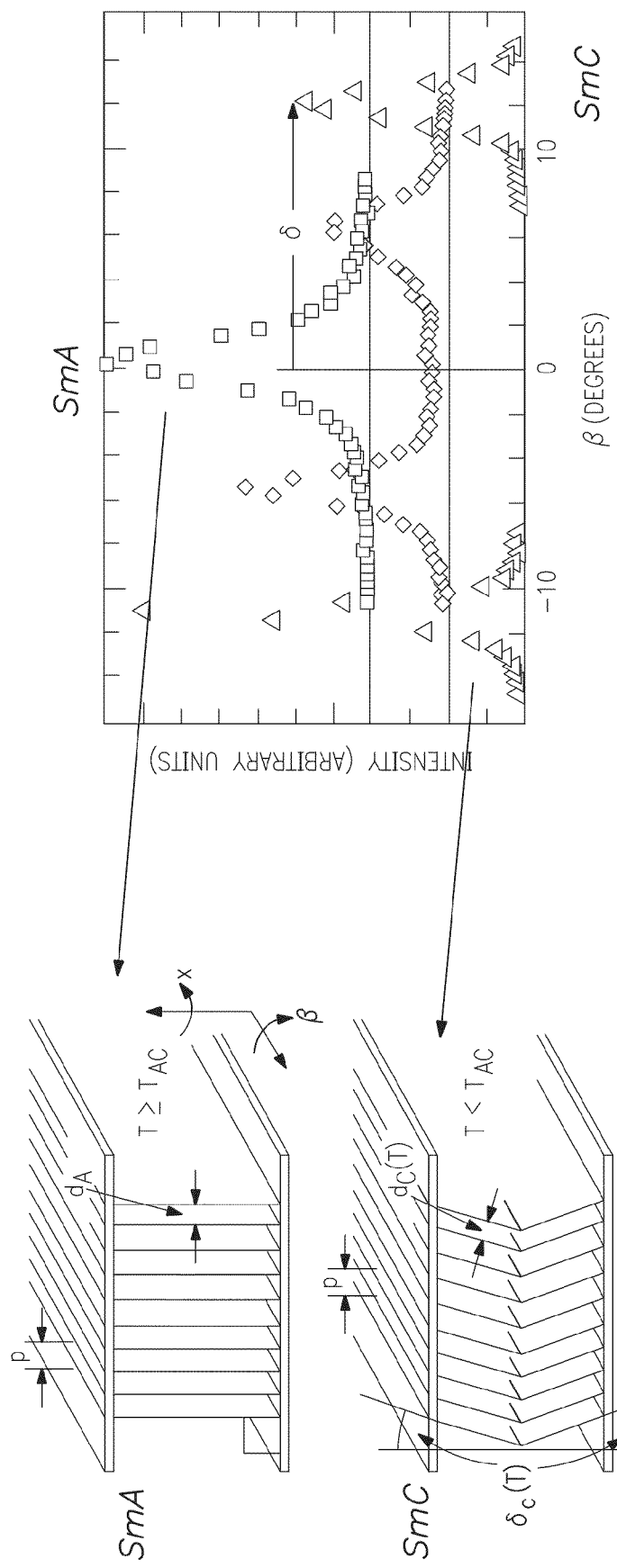
FIG. 3 shows manufacturing steps to produce bookshelf alignment in the (nonferroelectric) Smectic A (SmA) phase are known. Unfortunately, upon cooling into the technologically valuable (ferroelectric) Smectic C* (SmC*) phase, the desired alignment structure becomes unstable and splits into two orientations that meet at the center of the cell forming a "chevron" defect. This change in structure is evident in the xray diffraction pattern (right), changing from a single peak in the SmA phase, indicating all layers are oriented a single, bookshelf orientation, to two peaks in the SmC* phase, indicating two populations that are rotated by equal and opposite angles with respect to the desired bookshelf orientation.

Without wishing to be bound by any particular theory, there can be discussion herein of beliefs or understandings of underlying principles or mechanisms relating to the invention. It is recognized that regardless of the ultimate correctness of any explanation or hypothesis, an embodiment of the invention can nonetheless be operative and useful.

In general, the terms and phrases used herein have their art-recognized meaning, which can be found by reference to standard texts, journal references and contexts known to those skilled in the art. The definitions are provided to clarify their specific use in the context of the invention.

As used throughout the present description, the expression "a group corresponding to" or a "group" an indicated species expressly includes a radical, including monovalent, divalent and polyvalent radicals for example, an aromatic or heterocyclic aromatic radical, of the groups listed provided in a covalently bonded configuration, optionally with one or more substituents, including but not limited to electron donating groups, electron withdrawing groups and/or other groups.

As used herein, "alkyl" groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. An alkoxy group is an alkyl group that has been modified by linkage to oxygen and can be represented by the formula R—O and may also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups. As used herein MeO— refers to $CH_3O$—.

Aryl groups include groups having one or more 5- or 6-member aromatic or heteroaromatic rings. Heteroaryl groups are aryl groups having one or more heteroatoms (N, O or S) in the ring. Aryl groups can contain one or more fused aromatic rings. Heteroaromatic rings can include one or more N, O, or S atoms in the ring. Heteroaromatic rings can include those with one, two or three N, those with one or two O, and those with one or two S, or combinations of one or two or three N, O or S. Aryl groups are optionally substituted. Substituted aryl groups include among others those which are substituted with alkyl or alkenyl groups, which groups in turn can be optionally substituted. Specific aryl groups include phenyl groups, biphenyl groups, pyridinyl groups, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms.

Optional substitution of any group includes substitution with one or more of the following substituents: halogen, —CN groups, —$OCH_3$, —$CF_3$, —$CF_2CF_3$, —$CH_2CF_3$, $CH_3$, $NO_2$, $CH_2R$, $CH_2OR$, where R is a C1-C3 alkyl, and other substituents known in the art.

Deuterium can be substituted for any H in the polymer backbone or LC side groups.

As used herein, the term "halo" or "halogen" refers to a halogen group such as a fluoro (—F), chloro (—Cl), bromo (—Br) or iodo (—I).

As is customary and well known in the art, hydrogen atoms in the formulas shown herein are not always explicitly shown.

It should be noted that as used herein and in the appended claims, the singular forms "a", "an", and "the" include plural reference unless the context clearly dictates otherwise. Thus, for example, reference to "an item" includes a plurality of such items and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

As to any of the groups described herein which contain one or more substituents, it is understood, that such groups do not contain any substitution or substitution patterns which are sterically impractical and/or synthetically non-feasible. In addition, the compounds of this invention include all stereochemical isomers arising from the substitution of these compounds.

The compounds of this invention may contain one or more chiral centers. Accordingly, this invention is intended to include racemic mixtures, diasteromers, enantiomers and mixture enriched in one or more steroisomer. The scope of the invention as described and claimed encompasses the racemic forms of the compounds as well as the individual enantiomers and non-racemic mixtures thereof.

The compounds and formulas of the invention may be used in liquid crystal display devices as known in the art. Methods of preparing and using liquid crystal display devices, including preparation and use of cells is well known in the art.

The invention is further detailed in the following Examples, which are offered by way of illustration and are not intended to limit the scope of the invention in any manner.

It has been discovered that with the polymer additives described here, the alignment quality is significantly improved, resulting in high contrast LC devices.

Instead of in situ polymerization, a polymer additive that is soluble in the FLC is used here. Specifically, a side group liquid crystal polymer (SGLCP), i.e., a polymer that has pendant liquid crystalline groups and can undergo the change in orientational order along with the LC host (solvent) is used. For a chosen LC host, the pendant side groups can be designed to confer solubility in the LC phase(s) using the methods described here. In nematic solvents, small quantities of polymer have only a small effect on the switching speed, a consequence of the orientational coupling between the polymer and the LC (9). In smectic systems, however, the switching occurs within the layers—without moving the layers. Therefore, switching occurs without distorting the polymer, so the FLCs' switching speed remains fast. In an aspect of the invention, the polymer additive described here reduces zigzag defects, even when "shock cooled" (less than 10 seconds) into the Smectic C phase. This effect can be induced by two types of LC polymer dopants; end-on and side-on SGLCPs polymer.

Polymers with molecular weight ranging from 30,000 g/mol to 3,000,000 g/mol are particularly useful in a separate embodiments. A shorter polymer gives rise to the desired effects but this would require more polymer, making the use less economical. The longer the polymer, the less soluble it is in the FLC host and the polymer may undergo phase separation. The optimal molecular weight depends upon variables that include the chemical structure of the side-groups and the composition of the FLC host.

In an embodiment, a side-on polymer tested had a molecular weight of about 1.2 Million g/mol (a degree of polymerization of about 400 repeat units).

In an aspect of the invention, portions of the polymer are not cross-linked with other portions of the polymer or other polymers. In an aspect of the invention, the polymer is not a polyoxetane. In an aspect of the invention, the polymer is polyethylene. In an aspect of the invention, the polymer is polybutadiene. In an aspect of the invention, the composition of any portion of any side group liquid crystal polymer described herein can be combined with the composition of another portion of the side group liquid crystal polymer to form a different side group liquid crystal polymer which is intended to be disclosed individually to the extent as if it were shown explicitly, for the purpose of inclusion or exclusion in a claim. For example, any group provided herein as PX can be combined with any spacer W and any liquid crystal LC described to form a side group liquid crystal polymer which is useful in the invention, even if the combination is not explicitly shown.

The materials and devices of the invention do not contain "microdomains" of polymer interspersed with liquid crystals. Rather, the materials and devices of the invention comprise liquid crystal with polymer solubilized by the liquid crystal. The side group liquid crystal polymer of the invention is compatible and at least substantially homogeneous with the liquid crystal host.

In the compounds and methods of the invention, the side group liquid crystal polymer is not polymerized after contact with the ferroelectric liquid crystal host, but is polymerized before contact with the ferroelectric liquid crystal host.

As used herein, a "side group liquid crystal polymer" is a polymer having a liquid crystal group attached thereto. The liquid crystal group and polymer can be attached at a terminal position of the liquid crystal group (and the resulting structure is called an end-on SGLCP), or the liquid crystal group can be attached to the polymer at an internal position of the liquid crystal group (and the resulting structure is called a side-on SGLCP).

As used herein, "liquid crystal composition" or other variants of the phrase is a combination of a liquid crystal host material and a polymer additive which is soluble in the host at least at some temperature and concentration.

As used herein, "dissolve" or "soluble" when referring to the side group liquid crystal polymer of the invention and liquid crystal host means the side group liquid crystal polymer does not phase separate from the liquid crystal host. Therefore, the side group liquid crystal polymer can undergo the change in orientation order along with the liquid crystal host.

As used herein, "single bond" means that two groups are directly attached to each other. For example, when a ring is attached to a substituent with a single bond, there are no intervening groups between the ring and the substituent.

As used herein, the use of a line coming off of a substituent when used as a portion of a molecule is standard in the art and indicates that there is another substituent attached, not necessarily that there is a carbon unit terminating. For example, in the group

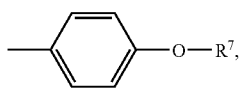

the line attached to the phenyl ring does not mean there is a terminal —CH$_3$ group attached or a —CH$_2$— linker unless those interpretations are consistent with the chemical usage, but rather the group is attached to another group in the molecule. In the group

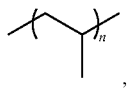

the two lines terminating the repeating unit are intended to be a carbon unit (—CH$_3$ groups) and the line exiting the repeating unit vertically is intended to indicate attachment to another group. This usage is standard in the art.

In an embodiment of the invention, the side group liquid crystal polymers of the invention are not copolymers or block copolymers, and have only one polymeric group, generally designated as "PX" in an embodiment. A repeating unit in a spacer group is not considered a polymer in the context of distinguishing the molecules here from copolymers or block copolymers.

Example 1

As an example, the invention was demonstrated using 1.5% of a side-on butoxybenzoate SGLCP (FIG. 4c, where n is 400) which is soluble in the chosen FLC matrix TM10000, composed primarily of phenylpyrimidine, fluorinated terphenyl, and partially fluorinated tail phenyl pyrimidine and phenylpyridines. The physical properties of this host are as follows:

Ps=–27 nC/cm2
I 105 N* 99 A 92 C* –30 X
Viscosity=90 mpas
Tilt angle=24°

Figure 4A:
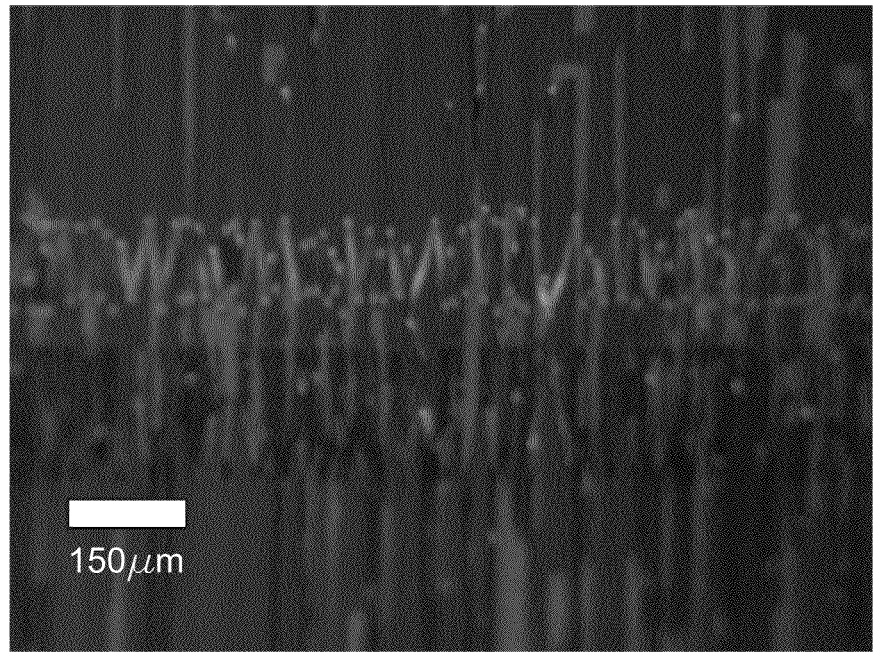
FIG. 4(a) shows pure FLC host after uncontrolled cooling shows zigzag defects (b) shows FLC host with 1.5% side-on SGLCP results in no zigzag defects, only line defects (c) is a drawing of the butoxybenzoate SGLCP structure.

At this low concentration, the polymer additive has no adverse effect on the phase transition temperatures of the host FLC (no depression of the SC* temperature range). Optical microcopy showed the zigzag defects that are prevalent in the pure FLC host are absent when 1.5% by weight of this side-on polymer is added (FIG. 4a vs. 4b). Note that no special thermal history was used: the samples were simply allowed to cool to ambient conditions without any temperature control. This remarkable suppression of zigzag defects is conferred by the additive itself. The additive eliminates the need for "perfect" thermal uniformity during cooling (which has limited FLC displays to very small sizes and has necessitated batch processing); and it eliminates the need for slow cooling (which has added to the cost of FLC displays due to long cycle times in batch processing).

Figure 4B:
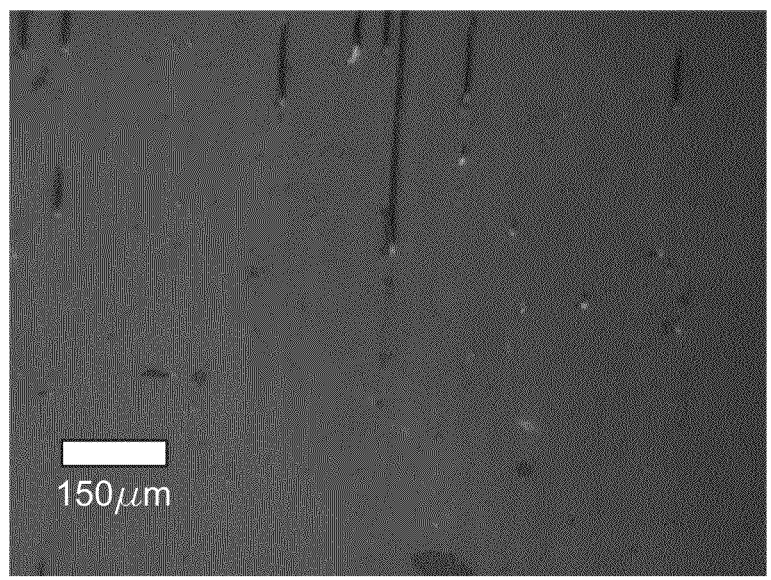
FIG. 4(d) is the 1.5% 107PBSC6PPC10 (polymer 4) dissolved in the FLC host. The circles are the spacer balls used to make the cell uniform thickness.

Instead of the deleterious zigzag defects (FIG. 4a), what is seen are the less problematic needle defects originating from the spacers of the cell (FIG. 4b). These types of defects leak much less light than the larger zigzag defects; furthermore, they can be eliminated by refining the rate of filling the cell to minimize the disturbance created in the wake of the spacers (monodisperse spheres that are sparsely distributed in the cell to maintain a precise spacing between the walls).

Figure 4C:
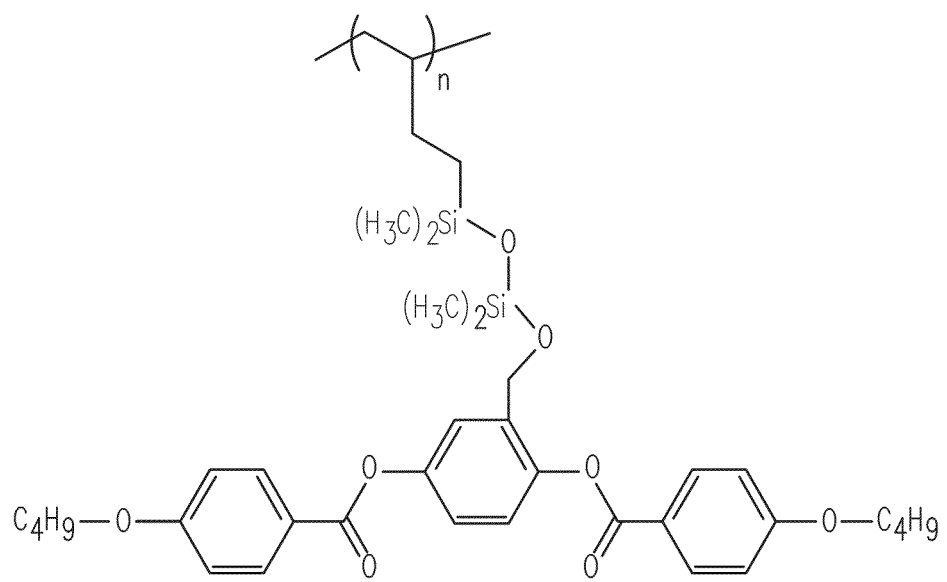
Figure 5:
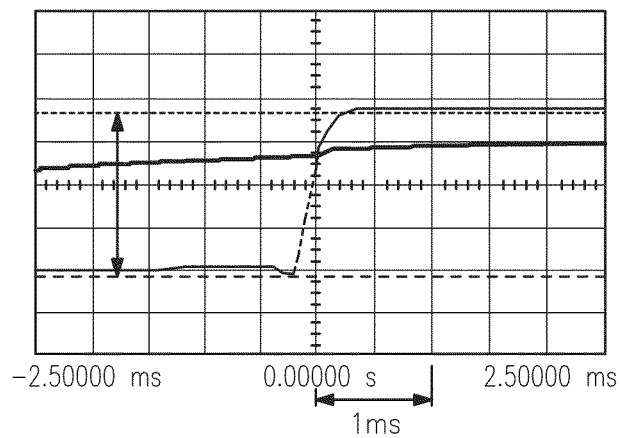
FIG. 5 shows (a) Pure FLC host the light transmission under DC balanced bipolar pulse, the typical operating mode for an FLC device, was reduced to more than ⅓ of its transmission under square wave drive typical of monostable FLC switching. (b) Addition of 1.5% polymer to this FLC host results in retention of most of the switching angle in the FLC cell—the signature of bookshelf alignment, affording bistable behavior. (c) At many pulse frequencies, the sideon additive (at 1.5% in FLC) retains about 80% of the light transmitted through them.
Figure 5:
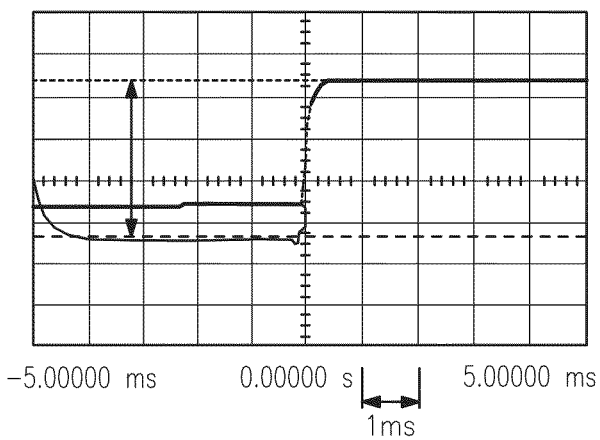
Figure 5:
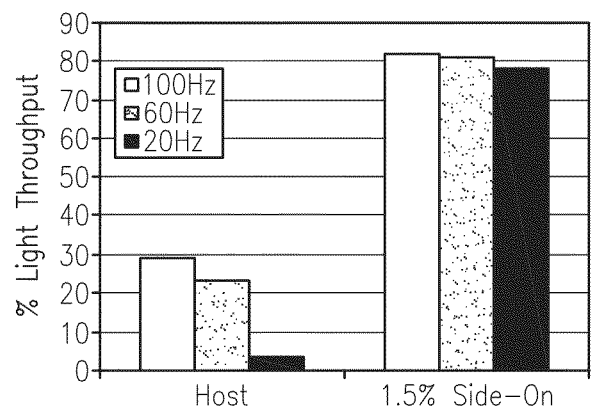

Electro-optical tests suggest that the absence of zigzag defects in the FLC-polymer mixture using side-on SGLCPs is not always merely due to having a single chevron throughout the cell. A simple optical test for the presence of chevron defects is to test for bistable switching: FLCs that are not in bookshelf geometry are not bistable. In this case, cells are prepared with the pure FLC itself are not bistable: after a pulse aligns all the dipoles in one direction it is turned off, and the desired alignment is lost within milliseconds (FIG. 5a, left). In contrast, cells prepared using the same protocol and the same FLC, simply with the addition 1.5% of SGLCP, clearly show bistable switching (FIG. 5b, right). Indeed, at all pulse frequencies tested, including 60 Hz—the typical video driving-frequency—both the polymer-doped FLC retains about 80% of the light transmitted when "popped" into the ON orientation. The side-on polymer used in these experiments is shown in FIG. 4c where n=400. The end-on polymer used in these experiments is shown in structure FX10.

The effects of fewer zigzag defects and significant bistability are conferred by the polymer without loss of switching speed. The optical rise time (time for the transition from 10% to 90% of the change in transmitted intensity) is not significantly altered by the presence of 1.5% wt percent polymer (Table 1).

TABLE 1

| Material | Rise Time |
| --- | --- |
| Pure FLC Host | ~300 µs |
| 1.5% side-on polymer | ~300 µs |
| 1.5% end-on polymer | ~320 µs |

Additional data showing improvements in rise time is provided elsewhere herein.

Improvements in the FLC host's properties were achieved with the simplest polymer architecture in this experiment. In a head-to-head comparison with a coil-LC diblock that spontaneously self assembles into nanoscale architecture in LCs, the homopolymers turned out to be more effective at suppressing zigzag defects and more soluble in the FLC.

Figure 4D:
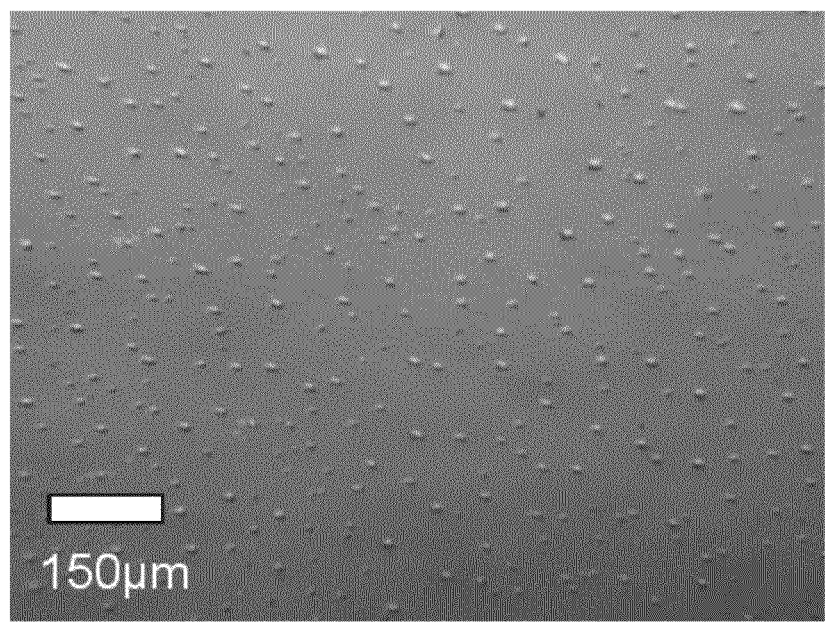

End-on polymers also suppress zigzag defects (see FIG. 4D) at concentrations tested. In an aspect of the invention, end-on polymers are believed to encourage a single chevron direction, leading to the suppression of zigzag defects.

To carry out the experiment described in this example, mixtures (solutions) with the same concentrations (1.5% by weight) of the side-on homopolymer and the side-on diblock polymer were made. 0.4 um cells of these cells were observed with polarized optical microscopy as described in more detail below. Zigzag defects were apparent for the diblock, but not for the homopolymers.

Example 2

FLCs Made with Different Liquid Crystal Groups and Polymers

In the development of a polymer-doped bistable FLC device, a theoretical understanding of the homopolymer stabilization of FLCs is described, and a structure/activity relationship study with a library of polymers and FLC hosts is described, making quantitative assessments of the improvements in bookshelf-stability, durability, bistability and tilt angle.

Liquid crystal groups are synthesized using art-known methods or are developed from existing materials. These liquid crystal groups are coupled to polymer backbones of different lengths using methods described herein and known in the art. FLC mixtures are developed with desired phase sequences. A Structure Activity Relationship is determined by evaluating effects of polymer design on solubility, alignment, LC phases and bistability; and evaluating effects of FLC phase sequence on solubility, alignment and durability. Materials analysis is performed using techniques including Small angle x-ray analysis; Electro-optic analysis; and Shock and pressure sensitivity tests. Lifetime measurements are performed. Also, laboratory and engineering prototype bistable polymer-doped FLC device are created. These aspects are described further herein 1. Materials A. Hosts The side group liquid crystal polymers of the invention can be used with any conventional FLC host. The composition and preparation of hosts are known in the art. Some specific examples are provided herein and are not intended to limit the possible hosts, but merely provide examples.

Phenylpyrimidine Host

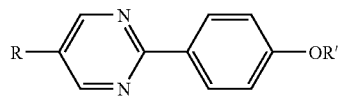

Composition:

| R | R' | Percent in mixture |
|---|----|--------------------|
| C7H15 | C9H19 | 25 |
| C9H19 | C8H17 | 25 |
| C8H17 | C8H17 | 25 |
| C8H17 | C9H19 | 25 |

This mixture results in a formulation with a phase diagram I 70 SmA 54 SmC 12 X. Upon addition of 20% of the following nematic inducing compound, to the above phenylpyrimidine mixture,

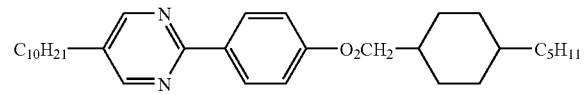

a nematic phase was introduced, resulting in a mixture with a phase diagram:
I 88 N 75 SmA 70 SmC −12 X.

Addition of 15% of the fluorinated chiral additive shown below,

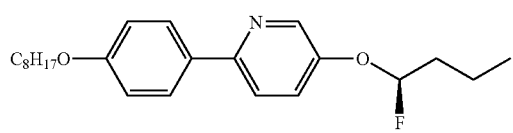

affords an FLC mixture (MX40010), with the following characteristics:
I 86 N 73 SmA 66 SmC −22 X
Ps=15 nC/cm2 @ 23 C
Viscosity=82 mpas
Tilt angle=25 degrees Many different chiral additives formed by attaching a chiral tail to an FLC core, affords spontaneous polarization to the mixture to impart the property of fast switching speed. Examples of such tails and cores are:

Chiral Tails:

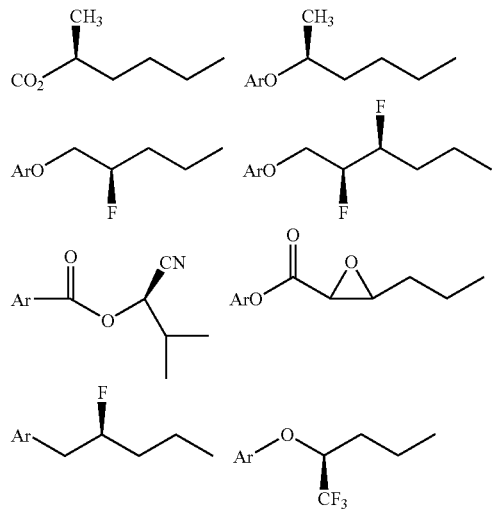

Mesogenic FLC Cores:

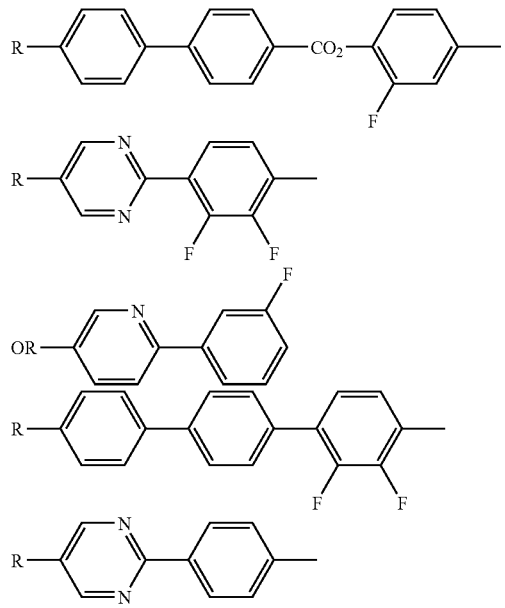

The FLC host hosts described in Krause et al., U.S. Pat. No. 4,871,472 (issued Oct. 3, 1989) can also be used with the polymer dopants described herein.

Example Host 1

A liquid crystal phase consisting of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine, 3% of 2-p-nonyloxyphenyl-5-heptylpyrimidine,
7% of 2-p-hexyloxyphenyl-5-nonylpyrimidine,
23% of 2-p-nonyloxyphenyl-5-nonylpyrimidine,
28% of r-1-cyano-1-butyl-cis-4-(4'-octyloxybiphenyl-4-yl) cyclohexane,
14% of r-1-cyano-1-hexyl-cis-4-(4'-heptylbiphenyl-4-yl)cyclohexane,
6% of r-1-cyano-1-(4-pentylcyclohexyl)-cis-4-(4-pentylcyclohexyl)cyclohexane and
10% of 4-[3-chloro-4-octyloxybenzoyloxy]-4'-(2-5 chloro-3-methylbutyryloxy)-biphenyl has a Sc* 78° SA 83° Ch 102° I and a spontaneous polarization Ps of 20 nC/cm2.

Example Host 2

A liquid crystal phase consisting of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
7% of 2-p-hexyloxyphenyl-5-nonylpyrimidine,
23% of 2-p-nonyloxyphenyl-5-nonylpyrimidine,
28% of r-1-cyano-1-butyl-cis-4-(4'-octyloxybiphenyl-4-yl) cyclohexane,
14% of r-1-cyano-1-hexyl-cis-4-(4'-heptylbiphenyl-4-yl)cyclohexane,
6% of r-1-cyano-1-(4-pentylcyclohexyl)-cis-4-(4-pentylcyclohexyl)cyclohexane and
10% of 4-[3-cyano-4-octylbenzoyloxy]-4'-(2-chloro-3-methylbutyryloxy)-biphenyl has Sc* 75° SA 78° Ch 98° I and a spontaneous polarization Ps of 18 nC/cm2.

Another example of an FLC host based on fluorinated terphenyl system is shown below:

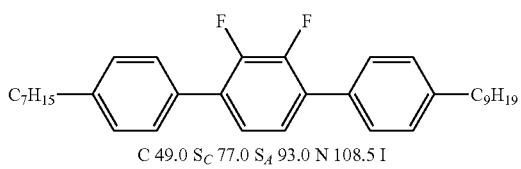

C 49.0 $S_C$ 77.0 $S_A$ 93.0 N 108.5 I

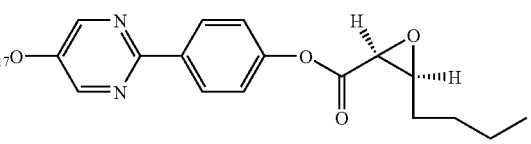

C 48.5 $S_C$ 95.0 N 141.5 I

C 89.5 $S_C$ 155.5 $S_A$ 165.0 N 166.0 I

C 48.5 $S_C$ 81.0 N 108.5 I

The terphenyl mixture can be formulated into an excellent low viscosity host in equivalent amounts to afford a phase diagram:
I 118 N 105 SmA 95 SmC −22 X
Adding 5% chiral epoxy ester gives the resulting mixture, MX40018, which showed the following properties:
I 112 N 108 SmA 90 SmC −25 X
a Ps=34 nC/cm2
viscosity of 64 mpas
tilt angle of 22 degrees.
rise time of 120 μs at 5 V.

Provided below is another chart showing Smectic C host materials for formulation of FLC mixtures.

| R | Crystal | Smectic C | Smectic A | Nematic | Isotropic |
|---|---|---|---|---|---|
| C9H19—⌬—pyrimidine—C9H19 | • 49 | — | • 61 | — | • |
| C9H19—⌬—pyrimidine—OC8H17 | • 36 | • 52 | • 85 | — | • |
| C8H17O—⌬—pyrimidine—C9H19 | • 33 | • 61 | • 75 | — | • |
| C8H17O—⌬—pyrimidine—OC8H17 | • 51 | • 91 | • 100 | • 101 | • |

| R | Crystal | Smectic C | Smectic A | Nematic | Isotropic |
|---|---|---|---|---|---|
| $C_3H_7OC_5H_{10}$—⌬—pyrimidine—$OC_8H_{17}$ | • 8 | • 47 | • 69 | — | • |
| $C_9H_{19}$—⌬—pyrimidine—$O_2CC_7H_{15}$ | • 82 | — | — | — | • |
| $C_7H_{15}CO_2$—⌬—pyrimidine—$C_9H_{19}$ | • 53 | • 64 | • 65 | — | • |
| $C_7H_{15}CO_2$—⌬—pyrimidine—$OC_8H_{17}$ | • 74 | • 90 | • 93 | • 94 | • |
| $C_8H_{17}O$—⌬—pyrimidine—$O_2CC_7H_{15}$ | • 69 | • 85 | — | • 96 | • |
| $C_3H_7OC_5H_{10}$—⌬—pyrimidine—$O_2CC_7H_{15}$ | • 70 | — | — | — | • |
| $C_7H_{15}CO_2$—⌬—pyrimidine—$O_2CC_7H_{15}$ | • 81 | • 93 | — | • 97 | • |

Reference: Kelly and O'Neill. Chapter 1, "Liquid Crystal for electro Optic Applications", Handbook of Advanced Electronic and Photonic Materials and Devices, edited by H. S. Nalwa, Volume 7: Liquid Crystals, Display and Laser Materials, 2000 by Academic Press

B. Polymer Dopants

The suite of polymers described here allows targeting the effects of molecular weight, spacer length side group dipole strength and direction, and side group rigidity on solubility, optical properties, durability and bistability. This information allows optimization of the polymer-FLC mixture towards greatest commercial success, in an embodiment.

C. Molecular Weight

If a much longer polymer chain confers the desired material property enhancements here at a much smaller concentration of polymer, even less of the polymer additive can be used per display screen. The use of different molecular weight polymers and different length backbones and spacers in the dopants can be made using the methods described herein and studied. Polymers with different molecular weights have different radii of gyration ("Rg"), that is, different cross-sectional areas.

D. Spacer Length and Type

The length and flexibility of the spacer groups connecting the side group to the polymer can have large effects on the orientational coupling between the chain backbone and the mesogenic side groups. For example, short spacers and side-on attachment make the polymer adopt a prolate ("cigar" shaped) conformation when dissolved in nematic LCs. In a smectic host, this may cause the chain to align on average normal to the layers, with its elongated axis crossing multiple layers. By increasing spacer length while keeping the backbone length fixed, the degree of elongation of the polymer conformation can be decreased.

In addition to the conformational effects of the spacer, the length of the spacer can influence the way the liquid crystal and spacer situate themselves relative to the host molecules that form the smectic layers. Thus, spacer length affects both the solubility of the polymer and the alignment of the pendant liquid crystals, which couples to the alignment of the polymer backbone. Spacer lengths of interest range from short (e.g., ~C4H8~) to long (e.g., ~C12H24~). Because anisotropy and ordering are often subject to odd-even effects, even and odd numbers of carbon spacers are of interest (for example ~C5H10~ or ~C7H14~). In an embodiment, in the spacer "W" in the Formulas and structures described herein, x and y are the same. In an embodiment, in the spacer "W", x and y are different. In an embodiment, in the spacer "W", x and y are even integers. In an embodiment, in the spacer "W", x and y are odd integers. In an embodiment, in the spacer "W", x+y is an odd integer. In an embodiment, in the spacer "W", x+y is an even integer.

Figure 6:
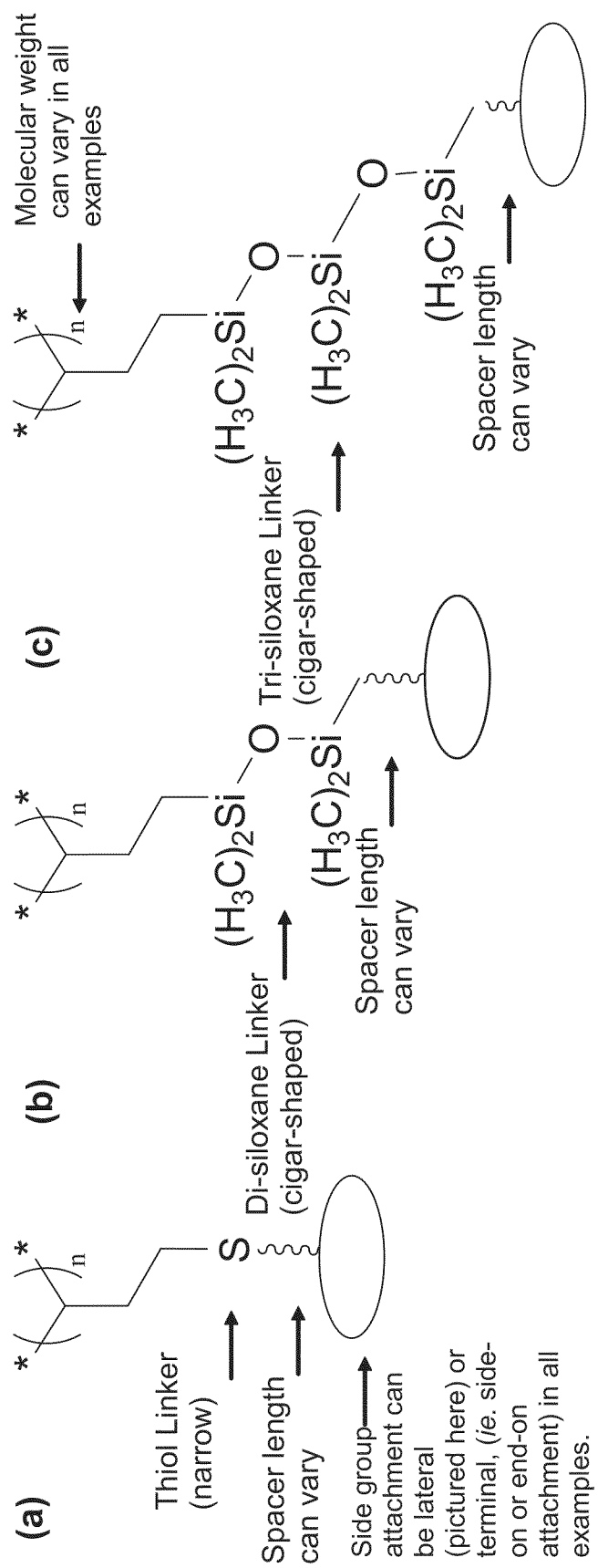
FIG. 6 shows that each of the coupling types described are amenable to side groups with various spacer lengths. (a) shows a linker made from thiolene coupling, this linker is narrow and flexible, (b) and (c) show linkers made from siloxane coupling, these spacers are bulkier as length of the siloxane linker increases.

The side groups are coupled to the polymers using methods described here and known in the art. Both siloxane coupling and thiol-ene coupling of side groups to polymers can be used (17). The siloxane linker is bulkier than thio-ether linker, changing both the conformation and dynamics of the polymers. These complimentary coupling techniques are used to optimize the effects of a thin, "waxy" spacer (see FIG. 6a) vs. bulkier spacer (see FIGS. 6b and c) for specific FLC mixtures.

E. Side Group Polarity, Magnitude and Direction

Figure 7:
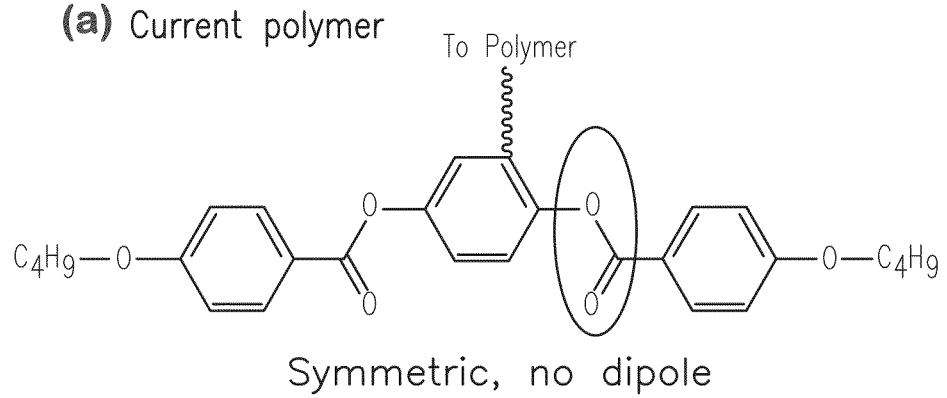
FIG. 7(a) shows a symmetric side group and thus has no net dipole, (b) shows a side group targeting the effect of a parallel dipole on the alignment of the FLC.
Figure 7:
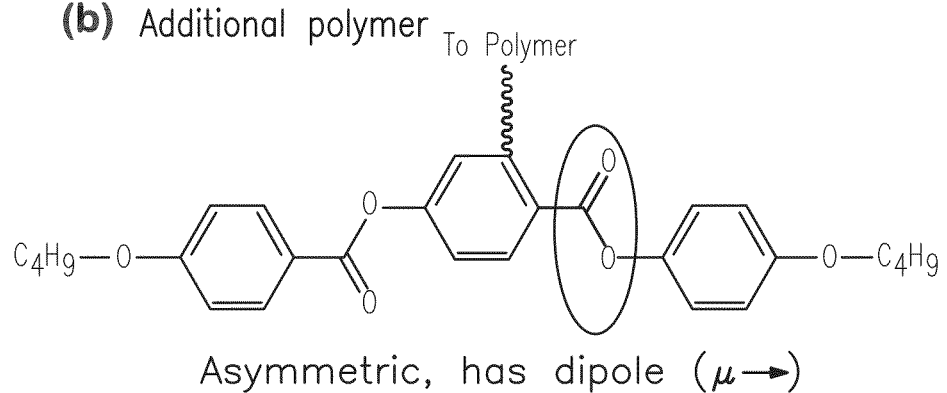

The side group on the polymer described above in Example 1 is a symmetric molecule, and thus has no net dipole moment (FIG. 7a). Using very simple modifications (Scheme 1b) to the original chemistry (Scheme 1a), an asymmetric side group very similar to the butoxybenzoate polymer can be synthesized. The dipole of the side group can be chosen based on performance criteria including but not limited to solubility in FLCs, suppression of zigzag defects, enhancement bistability, and shock stabilization.

Scheme 1. Reaction scheme to synthesize (a) symmetric side groups and (b) asymmetric side groups from (c) phenyl, biphenyl, and pyrimidine cores.

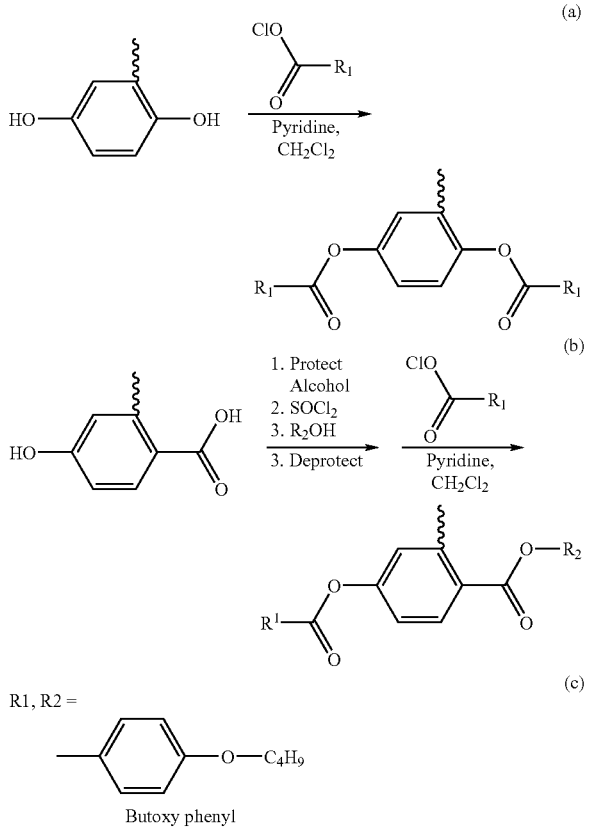

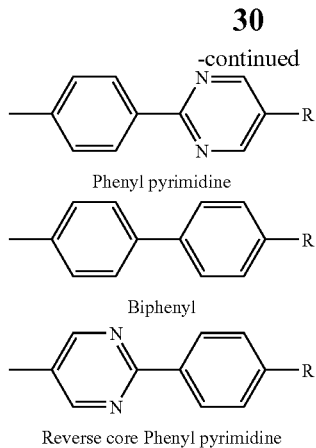

Figure 8:
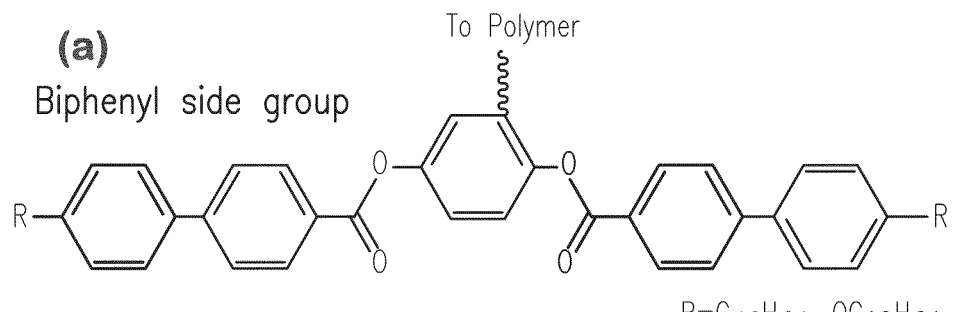
FIG. 8(a) shows two symmetric side groups with no net dipole targeting the effect of introducing phenyl pyrimidines (cores that match the FLC host cores) to the side group, (b) an asymmetric phenylpyrimidine core which targets the magnitude of the dipole.
Figure 8:
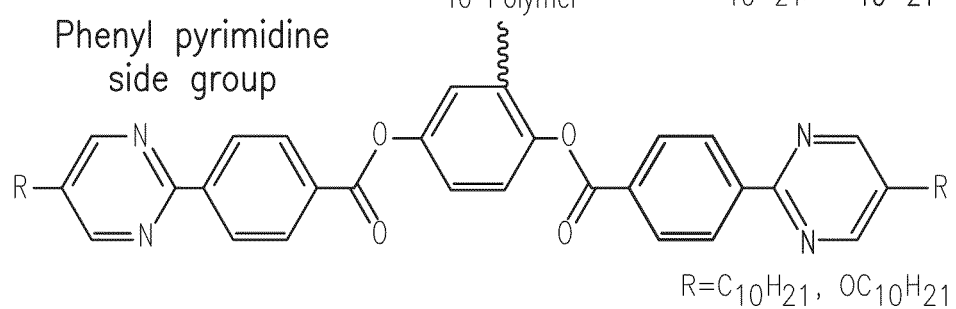
Figure 8:
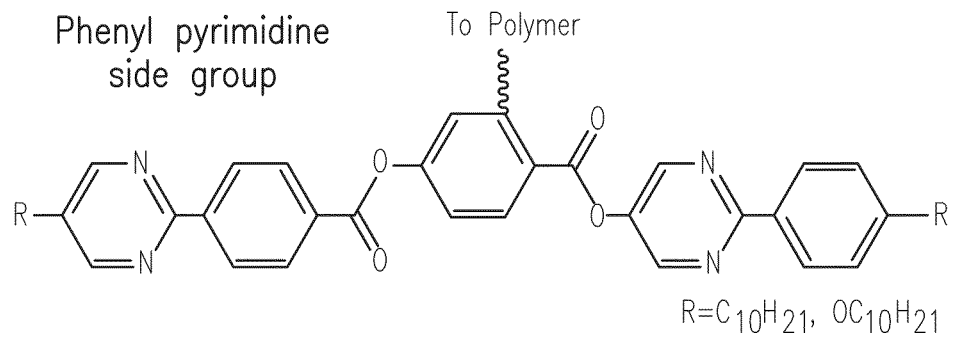
Figure 9A:
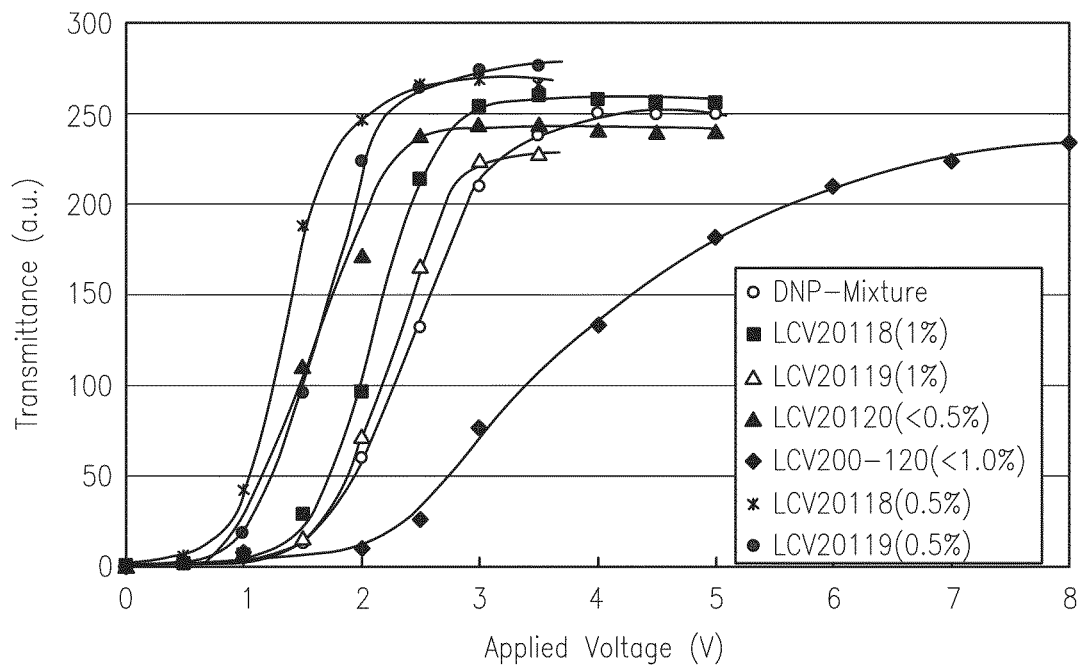
FIG. 9 shows electro-optic (EO) characteristics of FLC mixtures containing polymer additives.
Figure 9B:
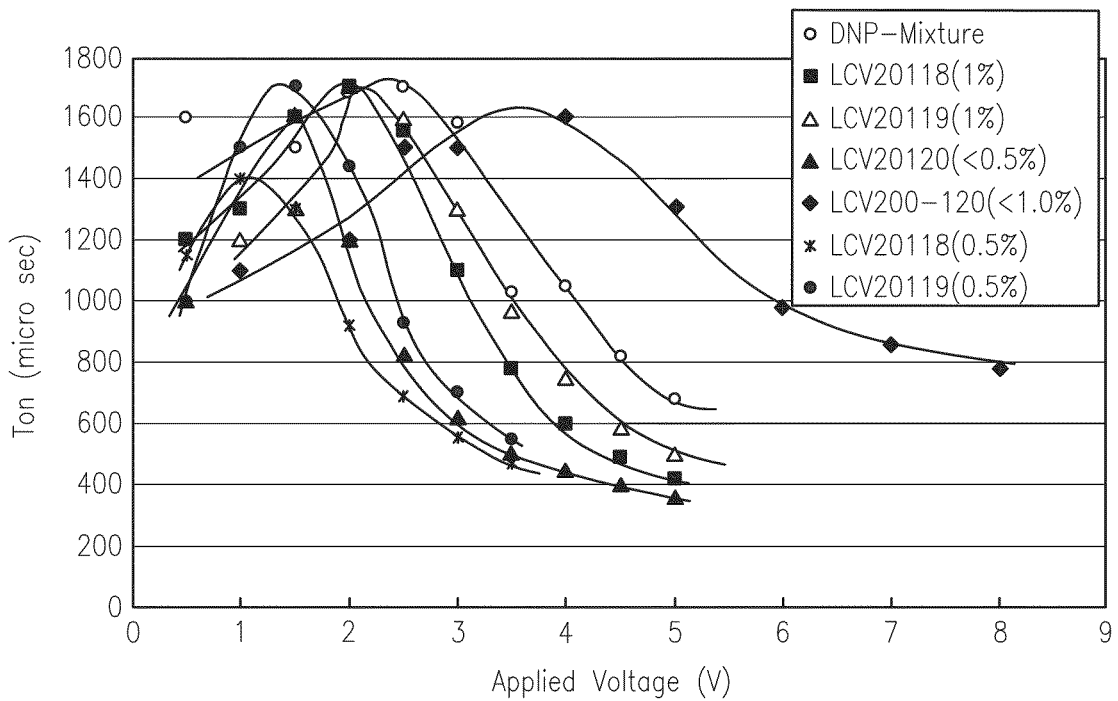

Asymmetric molecules are generally also more soluble in FLCs than symmetric ones. Introducing a dipole moment allow control over the LC director and thus control the alignment of the FLC. This illustrates cooperative effects between the dipole of the polymer and the dipole of the FLC host. The effect of the magnitude of the dipole moments can be targeted using other side groups such as phenyl pyrimidine side groups (see FIG. 8). The addition of nitrogens into the side group increases the magnitude of the polarity. The FLC host itself contains many components with phenyl pyrimidine cores, so in this example, there will be higher solubility and interaction between the side group and host. These side-groups are readily synthesized using methods described herein and known in the art. As an example, the symmetric phenyl pyrimidine side group can be compared to both the asymmetric phenyl pyrimidine side group and to the biphenyl side group, providing analysis of the effect of a strong dipole, as well as phenyl pyrimidine core itself.

In addition to dipole magnitude, the dipole direction can be controlled (Scheme 2). Terphenyl polymers are synthesized with varying amounts of fluorine substitution. This is also a straightforward synthesis, from commercially available compounds and provides side groups with dipole moments perpendicular to the long axis of the side group. This suite of polymers allows work in various alignment directions, depending on the application.

Scheme 2. The syntheses of the rigid terphenyl, with a dipole perpendicular to the long axis of the side group and the "floppy" di(ethylphenyl)phenyl cores.

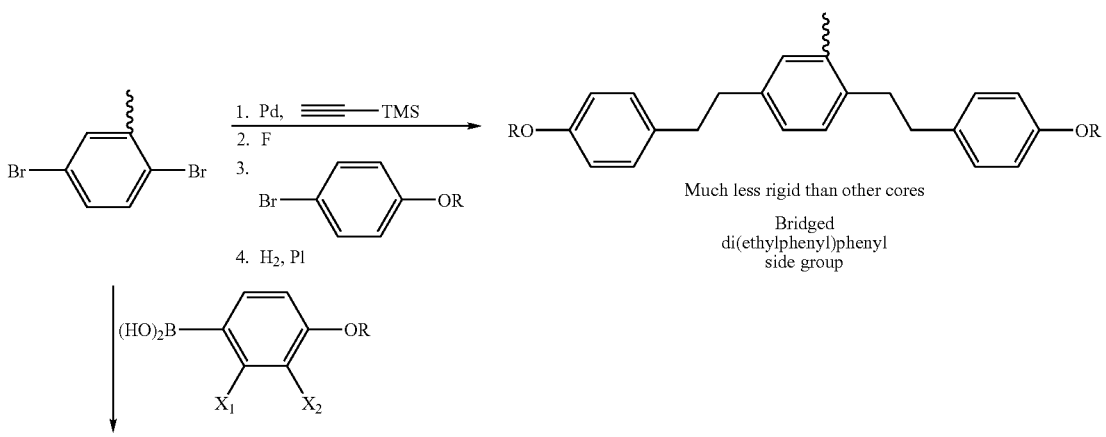

-continued

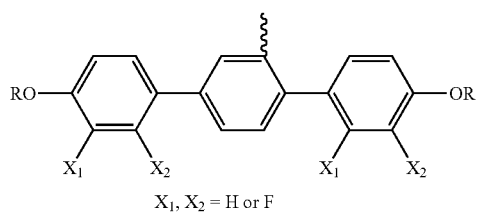

$X_1, X_2 = H$ or $F$

With either/both X1 X2 = F, has dipole ($\mu$!)

Terphenyl
side group

F. Side Group Rigidity

A much less rigid core than all of the aforementioned side groups can be synthesized such as a symmetrically bridged di-(ethylphenyl)benzene (Scheme 2).

G. FLC-Polymer Formulation

Polymer-FLC mixtures are formulated with the intention of optimizing the bookshelf geometry, bistability and contrast, while at the same minimizing the amount of polymer additive needed. The additives of this invention can be used with FLC hosts with different phase sequences (see below and elsewhere herein).

Using FLC components available commercially, FLC host mixtures can be made with different phase sequences upon cooling from their isotropic phase into their SmC* phase: isotropic to SmC* (I-C*), SmA to SmC* (I-A-C*) and cholesteric to SmA to SmC* (I-N*-A-C*) FLC hosts that possess the same phase sequence, but have significantly different core structures can have different optimal additive structures. Such factors as FLC polarizability, birefringence, and miscibility with the SGLCPs affect the optimal SGLCP structure.

In terms of processing, I-C* FLC mixtures have the advantage that upon forming the smectic C* phase from the isotropic phase, layers immediately form in a bookshelf structure. However, the "rubbing direction" does not impose a unique orientation of the layers: two populations of domains form and the degenerate mixture of domains is generally useless for displays. The polymer can be used to bias one state over the other; for example a monodomain of bookshelf structure can be formed, allowing all of the benefits of the I-C* phase sequence to be realized.

The second class of exemplary mixtures (I-SmA-SmC*) passes through a SmA phase to reach the SmC* phase. The layers are formed when the SmA phase is formed from the isotropic phase, usually with mediocre alignment due to the lack of order when the layers are first formed. Upon cooling into SmC*, only one direction of tilt is formed, leading to a useful structure for a display. The presence of the SmA phase also causes the layers to shrink as the mixture is cooled into the SmC* phase. This is simply a space-conserving mechanism resulting in the formation of kinks in the layers. If the kinks are all facing the same way (i.e., a monodomain of chevrons), no large scale defects are formed and is formed. However, much more typical is that the chevrons point in opposite directions near a defect point such as a spacer ball or a glue line near the edge of the display seal, resulting in zig-zag defects. The effect of the polymer dopant on the quality of the alignment and on the formation of kinks in the layers is studied.

The final class of exemplary FLC mixtures contain a nematic phase above the SmA phase, which is above the SmC* phase. The introduction of a nematic phase significantly improves the alignment quality since it has the least degree of restriction from movement, like a free-flowing oil, except that all the rod shaped molecules like to align in the same direction. Similar to the I-A-C* case, zig-zags are also formed, so any improvement towards bookshelf behavior in this class is very welcome and would result in enhanced FLC property performance.

2. Materials Evaluation

A. Small Angle Scattering (SAS) X-ray Analysis

Layer spacing vs. temperature experiments are performed to quantify the level of bookshelf character that each polymer truly induces. Small angle X-ray studies of the layer spacing are performed. This provides confirmation that bookshelf geometry has been achieved. The effect of temperature on layer behavior, essential for potential commercialization, and for determining manufacturing condition is studied. Because these studies provide information about the layer spacing dimensions, x-ray studies also provide key insights into the mechanism of the bookshelf stabilization observed. If the polymers suppress chevron formation by helping nucleate new layers to fill the space created by the molecular tilting, this is seen directly from the x-ray diffraction peak.

B. Optic and Electro-Optical Evaluation

Optic and Electro-optic studies are the backbone of the structure-activity relationship studies. Polarized optical microscopy are used to characterize the defects, determine the tilt angle and the birefringence. Based on the performance of the polymer used in Example 1, the mixtures described herein have very few, if any, defects. This has a direct impact on the contrast of the resulting display. This also corresponds to high contrast materials. The tilt angle is tested before and after the addition of polymer and mixtures that display tilt angle closest to the ideal tilt angle of 22.5° are selected. The birefringence of the mixtures is evaluated to ensure there is no reduction upon addition of polymer.

Electro-optic measurements provide ways to determine the effect of the polymers on rise time and bistability by driving aligned test cells with a square wave or a DC pulse, respectively and observing the effect on transmission of light through the cell. The addition of polymers with their own internal dipoles, should increase the effect on alignment, and thus bistability.

C. Lifetime Testing

In order to determine the lifetime stability of the polymer-FLC mixture, accelerated aging tests on aligned FLC cells can be performed. The cells are subjected to temperature cycling between extreme temperatures and temperature cycling at a rapid rate to simulate aging of the material.

Example 3
Experimental and Synthetic Methods
Table 2 shows additional dopants used.
TABLE 2
| Compound Number | Structure |
|---|---|
| 1 | 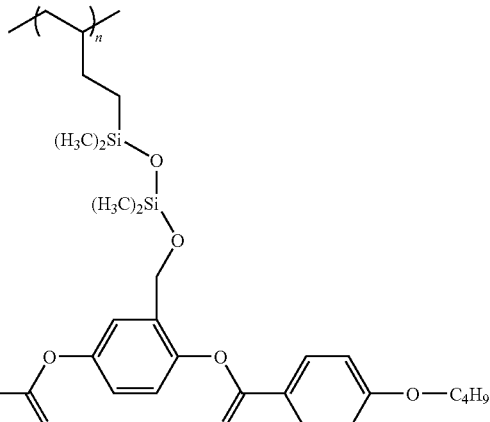 n = 400 |
| 2 | 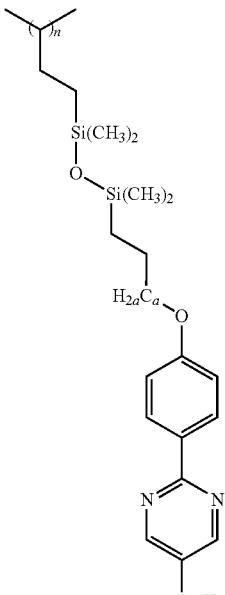 n = 800; a = 7 |

TABLE 2-continued
| Compound Number | Structure |
|---|---|
| 3 | 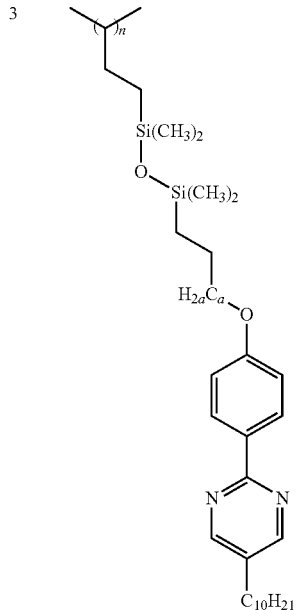<br>n = 800; a = 8 |
| 4 | 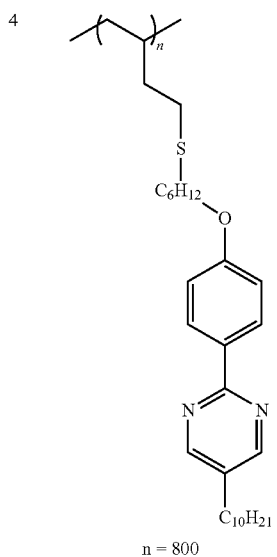<br>n = 800 |

TABLE 2-continued

| Compound Number | Structure |
|---|---|
| 5 | [Structure with n = 880] |
| 6 | [Structure with n = 880] |

Materials and Instrumentation 4-(5-decylpyrimidin-2-yl)phenol was purchased by LC Vision from Roman Dabrowski's laboratory at the Military Institute in Warsaw. All other reagents were obtained at 99% purity from Sigma Aldrich and used as received. Polybutadiene (98% 1,2 content) of size $1.07 \times 10^3$ g/mol and narrow molecular weight distribution (of polydispersity index 1.07) were synthesized by Dr. Steven Smith of Procter and Gamble Co. $^1$H NMR spectra were obtained using a Varian Mercury 500 MHz spectrometer, recorded in $CDCl_3$ and referenced to tetramethylsilane. Polymer molecular weight measurements were obtained by gel permeation chromatography in tetrahydrofuran (THF) at 25° C. eluting at 0.9 mL/min through four PLgel 10 μm analytical columns (Polymer Labs, $10^6$ to $10^3$ Å in pore size) connected to a Waters 410 differential refractometer detector ($\lambda$=930 nm). The molecular weight measurements were analyzed based on calibrations using polystyrene standards.

The phase behavior and defect characterization were investigated by polarized optical microscopy using a Nikon trinocular head Optiphot microscope. Electric fields were generated by LC Vision's LCAS machine's waveform generator function, the electro-optic behavior was recorded by a Thorn labs DET10A photodetector and HP 54503A Digital oscilloscope.

Synthesis of Side-on Polymers

The side-on homopolymer (1), has a laterally attached butoxy benzoate side group (shown below). This and the diblock copolymers, with polystyrene end blocks and the same side group in the SGLCP block were synthesized.

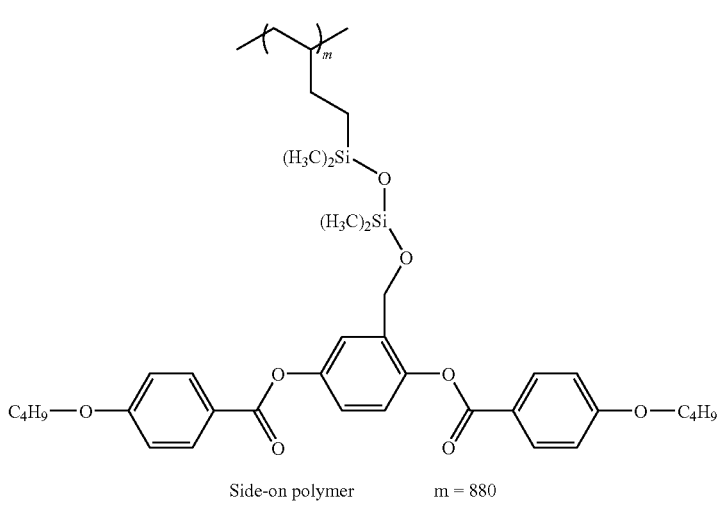

Side-on polymer    m = 880

Synthesis of End-on SGLCP Homopolymers

Synthesis of Vinyl-Terminated Phenyl Pyrimidines for Silane Coupling

Vinyl-terminated phenyl pyrimidines with different spacer lengths were synthesized from 4-(5-decylpyrimidin-2-yl)phenol for siloxane coupling to 1,2 polybutadiene. A general procedure for this synthesis is as follows: 4-(5-decylpyrimidin-2-yl)phenol (1.89 grams, 6.05 mmols), a bromoalkene (7-bromo hept-1-ene, 8-bromooct-1-ene or 10-bromododec-1-ene, 8 mmol) and $Cs_2CO_3$ (2.56 grams, 8 mmols) were stirred at room temperature in 40 mL of dimethyl formamide overnight, resulting in near-quantitative conversion to the ether (Scheme 3), monitored by thin layer chromatography. The reaction mixture was extracted three times with 50 mL of dichloromethane. The organic extracts were washed three times with water and dried with $MgSO_4$. The crude product was recrystallized in hot 95% ethanol, resulting in analytically pure white crystals of 5-decyl-2-(4-(hept-6-enyloxy)phenyl)pyrimidine, 5-decyl-2-(4-(oct-7-enyloxy)phenyl)pyrimidine, -decyl-2-(4-(dec-9-enyloxy)phenyl)pyrimidine (1.20 g, 2.09 g, 1.69 g AND 48.0%, 83.6%, 66.02% overall yield, respectively).

Scheme 3. Williamson ether synthesis of end-on phenyl pyrimidine mesogenic side groups

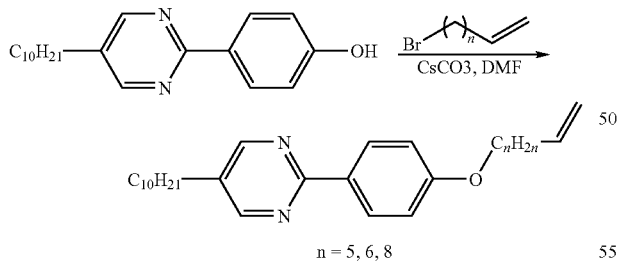

n = 5, 6, 8

Silane coupling and 1,2 Polybutadiene Functionalization

A siloxane linking group is added to the alkene-terminated phenyl pyrimidine mesogens by hydrosilation (shown below). The following is a general procedure describing the synthesis using one of the vinyl-terminated mesogens: A tenfold excess of 1,1,3,3-tetramethyldisiloxane (TMDS) (3 mL, 17 mmol) and the mesogens eg, C8PPC10V (0.693 g, xx 1.69 mmol) were dissolved in 20 mL anhydrous toluene. A drop of platinum catalyst (PC072 platinum divinyl complex in xylene, United Chemical Technologies, Bristol Pa.) was added and the mixture was stirred at 50° C. for 2 days. This reaction was monitored by thin layer chromatography, and, when completed, the solvent and excess TMDS are evaporated at 80° C. under vacuum and the product (SiC8PPC10) was purified by anhydrous columns chromatography (0.639 g, 69.1% yield).

Scheme 4. Siloxane coupling, first to vinyl-terminated mesogen, then to 1,2-polybutadiene.

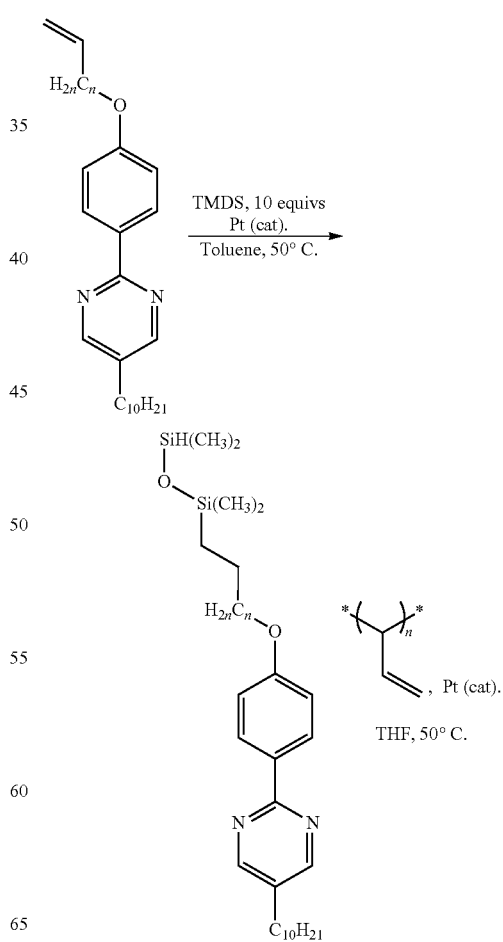

-continued

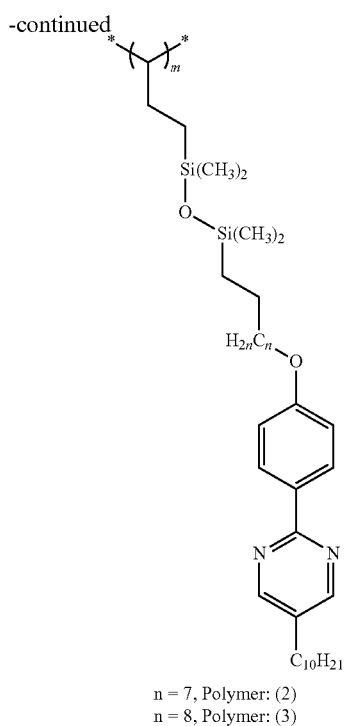

n = 7, Polymer: (2)
n = 8, Polymer: (3)

The siloxane-linked mesogen was then attached to the pendant vinyl groups of 1,2-polybutadiene, also by platinum catalyzed hydrosilation (Scheme 4). Polybutadiene (0.035 g, 0.6 mmols) was dissolved in 10 mL of anhydrous tetrahydrofuran (THF) under inert atmosphere. A one-and-a-half-fold excess of freshly purified SiC8PPC10 and one drop of platinum catalyst (PC085, platinum cyclovinyl complex in vinylmethylsiloxanes, United Chemical Technologies, Bristol, Pa.) and the mixture was heated at 50° C. for four to six days. Reaction progress was monitored by $^1$H NMR. When the reaction was complete it was quenched with excess styrene and heated at 50° C. overnight and the polymers (2 and 3) were then purified by evaporating all but the last 5 mL of solvent under vacuum, then repeated precipitation from THF solutions with cold methanol containing 10 ppm BHT, followed by drying to constant weight under vacuum at room temperature.

Synthesis of Benzoyl-Protected Thiols, for Thiol-ene Coupling.

Benzoyl-protected thiols were synthesized from 4-(5-decylpyrimidin-2-yl)phenol for thiol-ene coupling to 1,2 polybutadiene. 4-(5-decylpyrimidin-2-yl)phenol (1.89 grams, 6.05 mmols), 1-bromo-6-chloro-hexane (1.57 g, 8 mmol) and CsCO$_3$ (2.56 grams, 8 mmols) were stirred at room temperature in 40 mL of dimethyl formamide overnight, resulting in near-quantitative conversion of the ether (Scheme 4). The reaction mixture was extracted three times with 50 mL of dichloromethane. The organic extracts were washed three times with water and dried with Mg$_2$SO$_4$. The crude product was recrystallized in hot 95% ethanol, resulting in analytically pure white crystals (1.92 g; 76.56 overall yield) of 2(4-(5-cholohexyloxy)phenyl)-5-decylpyridine.

2(4-(5-cholohexyloxy)phenyl)-5-decylpyridine was then reacted with thiobenzoic acid (0.6 g, 4 mmol) and sodium bicarbonate (0.35 g, 4 mmol) and stirred 40° C. overnight (Scheme 5). The reaction mixture was extracted with ethyl acetate three times, washed three times with water, and dried with Mg$_2$SO$_4$. The crude pink solid was then recrystallized in hot 95% ethanol to give analytically pure pink needle-like crystals (2.2045, 85.1% yield).

Scheme 5. The synthesis of the protected thiol mesogenic phenyl pyrimidine side group.

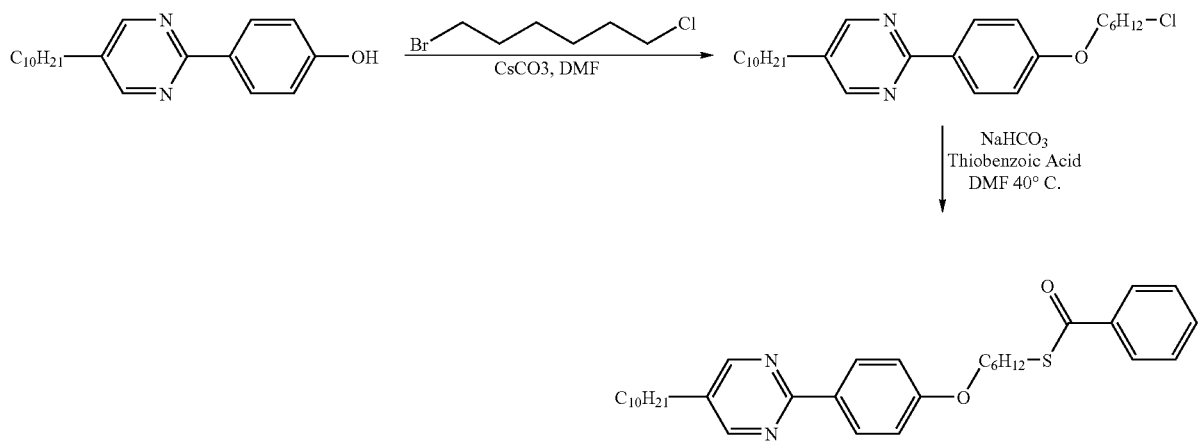

Thioester Cleavage and 1,2,-Polybutadiene Functionalization.

The thioesters in the benzoyl-protected thiols were cleaved and the resulting thiol terminated mesogens were coupled to 1,2 polybutadiene by radical initiated thiol-ene coupling. The thioester (1 g, 1.9 mmol) was first dissolved in 25-75 mL DMF with hydrazine monochloride (0.13 g, 1.9 mmol) and sodium acetate (0.13 g 1.9 mmol). The reaction mixture was purged with argon for 10 minutes and stirred for 6 hours at room temperature. The thiol product was extracted into 30 mL of chloroform, washed 3 times with water and transferred into a flask containing 1,2 PB (0.03 g, 0.6 mmol) and AIBN (50 mg, mmol) dissolved in 10 mL of chloroform. This mixture was then degassed in 2 freeze-pump-thaw cycles and then allowed to react at 55° C. for overnight. The final polymer product (4) was then purified by evaporating all but the last 5 mL of solvent under vacuum, followed by repeated precipitation from THF solutions with cold methanol containing 10 ppm BHT, then drying to constant weight under vacuum at room temperature.

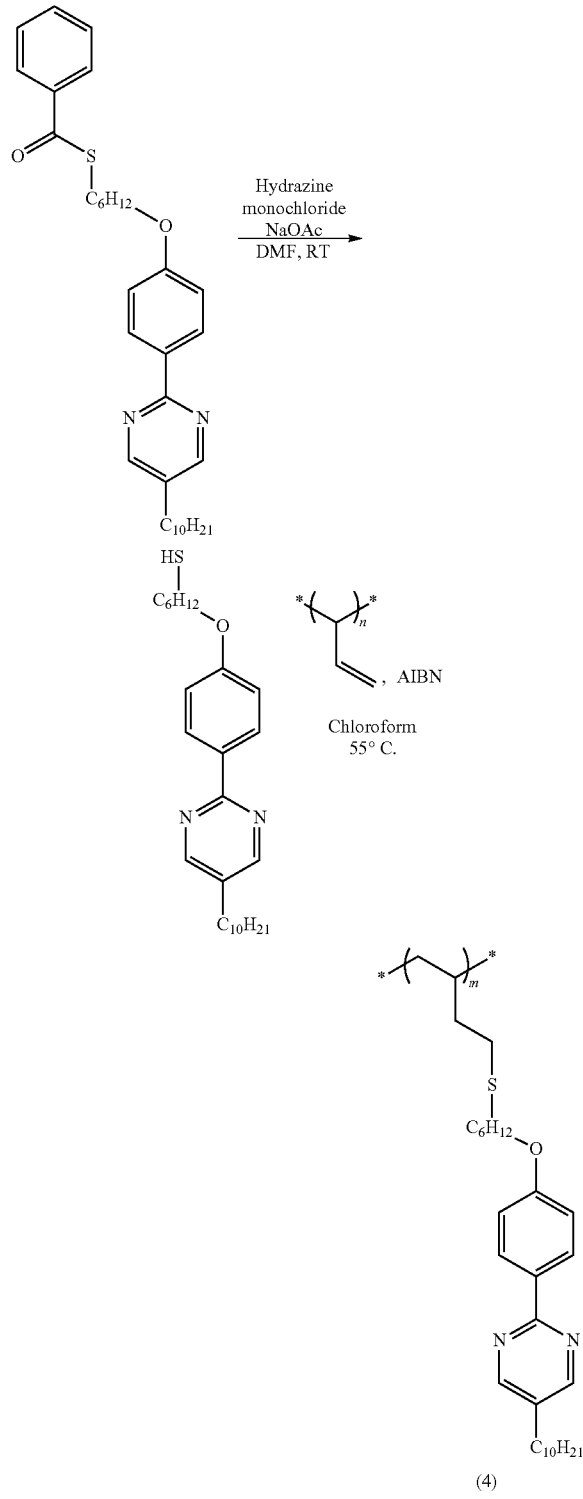

Scheme 6. Thioester cleavage into thiol, followed by direct, radical catalyzed thiol-ene coupling with 1,2-polybutadiene.

Cyclohexyl Ring Example

The molecule below is made using art-known synthesis methods and can be used in the methods of the invention as a side group liquid crystal polymer, where "polymer" is PX in the structures shown herein.

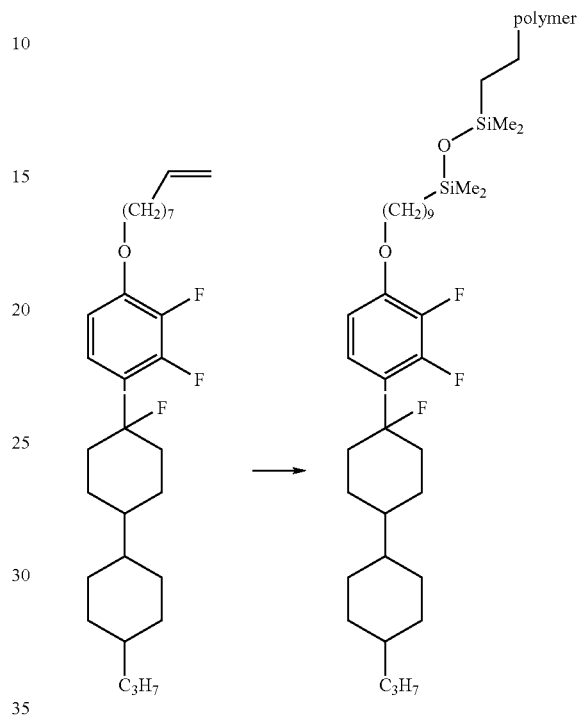

Polymer-FLC Solutions

Polymers were dissolved in a 10 component phenylpyrimidine FLC host. The host is a eutectic mixture of 10 components, most based on phenylpyrimidine mesogens. This mixture has a broad Sc* temperature range (sub-room temp to 95° C.), and an accessible isotropization temperature (115° C.) and narrow windows of $S_A$ (95° C.-104° C.) and nematic phases (104° C.-115° C.). Polymers were dissolved by repeated iterated heating to the isotropic phase followed by centrifugation and vortex mixing. The phase transition temperatures were determined by polarized optical microscopy and a hot stage.

Optical and Electrooptic Measurements.

Polymer-FLC solutions were loaded into 0.4 μm test cells treated with rubbed polyimide surface treatments and containing transparent ITO electrodes, by heating the both the cell and the mix to above the temperature of the FLC's isotropic transition and allowing the mixture to flow into the cells. The cells were then "shock-cooled" in air to room temperature, that is, no specific effort was made to slow cool and control the temperature gradient of the cell.

The rise time and contrast were measured by driving the cells at with a 100 Hz square wave at 5V or 8V. The cells were placed in a polarized optical microscope with crossed polars and a photodetector attached to the top. The photodetector was connected to an oscilloscope. The rise time was calculated to as the time it took for the light transmission to go from 10% to 90% of the transmission generated by the square wave, while the contrast was calculated by dividing the brightest state voltage (normalized to the "darkest state:" with crossed polars and no sample cell in the microscope, thus being as dark as the set-up could be) by the dark state's voltage (also normalized to the darkest state).

Bistability was measured by driving the same cells with a DC balanced bipolar pulse at 100 Hz and 20 Hz and monitoring the transmission loss after the switching pulse stopped, relative to a square wave at the corresponding frequency.

Tilt angle was measured by measuring the angle of rotation needed to align first on state, then the switched state with the polarizing filters. This number is the cone angle, which was then divided by two to get the tilt angle.

Results

Solubility in the FLC Matrix

Very little is known about the solubility of polymers in an FLC matrix, the first and important criterion for this work. At low concentrations, the family of polymers used were mostly soluble in the FLC host. 1.5% of polymer 1, the side-on SGLCP is soluble in the FLC matrix. At this low concentration, the polymer has no adverse effect on the phase transition temperatures of the host FLC (no depression of the $S_C^*$ temperature range). The very solubility of this polymer in the host shows the broad usefulness of this method, since it was not specifically designed for the FLC system. Of the molecularly designed siloxane coupled phenyl pyrimidine polymers, the 7-carbon spacer phenylpyrimidine, 2, was soluble at both 1.5 and 0.75 weight percent, however, the 8-carbon spacer phenylpyrimidine, 3, was not soluble at either weight percent of polymer. These polymers differ by only one carbon in their spacers, their molecular weight, percent conversion and mesogenic cores were identical, so the spacer length may a large impact on the solubility of the polymer and the manifestation of an odd-even effects, however, it is just as likely that the polymer, which already had a higher PDI became crosslinked over time, and non-crosslinked solutions of 3 in FLC would be achievable. The thiol coupled phenyl pyrimidine polymer, 4, was soluble at all concentrations tested. These results indicate that the solubility is quite general.

Side-on Polymer 1.

Polarized optical microcopy shows the zigzag defects that are prevalent in the pure FLC host are absent when 1.5% by weight of the polymer 1 is added (Data not shown). No special thermal history was used: the samples were simply allowed to cool to ambient conditions without any temperature control. This remarkable suppression of zigzag defects is appears to be conferred by the additive itself. This additive thus eliminates the need for "perfect" thermal uniformity during cooling (a factor that has limited FLC displays to very small sizes and necessitated batch processing); and also eliminates the need for slow cooling (which has added to the cost of FLC displays due to long cycle times in batch processing).

Instead of zigzag defects (FIG. 1), what are seen in this polymer-FLC mixture are needle defects that appear to originate at the spacers of the cell (monodisperse spheres that are sparsely distributed in the cell to maintain a precise spacing between the walls) in the filling direction. These types of defects leak much less light than the larger zigzag defects; furthermore, they may be eliminated by refining the rate or direction of filling the cell to minimize the disturbance created in the wake of the spacers.

Optical tests suggest that the absence of zigzag defects in the FLC-polymer mixture is not merely due to having a single chevron direction throughout the cell. A simple optical test for the presence of chevron defects is to investigate for bistable switching: FLCs that are not in bookshelf geometry are not bistable. Indeed, that cells prepared with the pure FLC itself were not significantly bistable: after a pulse aligned all the dipoles in one direction it was then turned off and an average of more than 60% of the transmission was lost within milliseconds (FIG. 5A,) which is typical of monostable switching. In contrast, cells prepared using the same protocol and the same FLC, but simply with the addition 1.5% of the side-on SGLCP, clearly show bistable switching (FIG. 5B, right). Indeed, at all pulse frequencies tested, including 60 Hz—the typical video driving-frequency—the polymer-doped FLC retains about 80% of the light transmitted when "popped" into the ON orientation.

TABLE 3

Optical analysis of polymer-FLC mixtures.

| Conc (wt %) | Sample | Rise Time (ms) | Tilt Angle | Contrast Ratio |
|---|---|---|---|---|
|  | FLC | 1.18 | 20.31 | 11.00 |
| 1.50% | 1 | 1.16 | 20 | 16.70 |
| 0.75% | 1 | 1.04 | 21.58 | 11.90 |
| 0.38% | 1 | 1.1 | 20.58 | 9.80 |
| 1.50% | 2 | 1.16 | / | 12.30 |
| 0.75% | 2 | 1.26 | 19 | 8.30 |
| 3.00% | 4 | 1.26 | / | 10.60 |
| 1.50% | 4 | 0.86 | 16 | 5.03 |
| 0.75% | 4 | 1.34 | 20.63 | 8.08 |
| 0.38% | 4 | 1.28 | 18.96 | 10.90 |
| 1.50% | 3 | 1.22 | / | 9.60 |
| 0.75% | 3 | 1.2 | 20.63 | 10.60 |

Contrast ratios vary between sample and concentration, but some samples have better contrast ratio than the pure FLC. The rise time, a measure of switching speed, and tilt angle do not appear to be significantly affected by the presence of polymer.

The reduction of zigzag defects and the significant bistability are conferred by the polymer without loss of switching speed or tilt angle. The optical rise time (the time to transition from 10% to 90% of the transmitted light intensity) and the tilt angle are generally not significantly altered by the presence of any concentration of polymer 1 (Table 1).

End-on Polymers, 2, 3, and 4.

Figure 10:
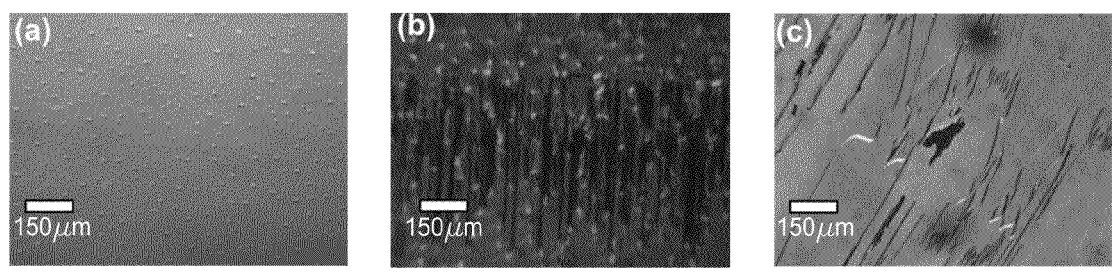
FIG. 10 shows (a) 1.5% of polymer 2 suppresses defects, (b) 1.5% of polymer 3 is clearly insoluble and does not suppress defects (c) 1.5% of polymer 4 has "skinny zigzags."

Polarized optical microcopy shows that 1.5% of polymer 2 suppresses zigzag defects, while 1.5% of polymer 3 and polymer 4 do not (FIG. 10). However, other concentrations of polymer 4 do suppress zigzag defects (Table 4).

TABLE 4

Further optical characterization of the polymer-FLC mixtures

| Conc (wt %) | Sample | Soluble? | Zigzags in Center |
|---|---|---|---|
|  | FLC | n/a | Y |
| 1.50% | 1 | Y | N |
| 0.75% | 1 | Y | Y |
| 0.38% | 1 | Y | N |
| 1.50% | 2 | Y | at voids |
| 0.75% | 2 | Y | N |
| 3.00% | 4 | Y | N |
| 1.50% | 4 | Y | Y |
| 0.75% | 4 | Y | N |
| 0.38% | 4 | Y | N |
| 1.50% | 3 | N | N |
| 0.75% | 3 | N | Y |

The end-on phenylpyrimidine polymers showed slightly more bistability than the pure FLC host (Table 4). It is interesting to note that, in general, being soluble in the FLC and being able to suppress zigzags in the bulk appear to be necessary but not sufficient criteria for enhanced bistability. Low concentrations of the side-on polymer (1) and higher concentrations of the thiol linked end-on polymer (4), were both soluble and suppressed zigzags, but showed no improvement in bistability over the pure FLC. The other interesting outlier was 1.5% of the 8-carbon-spacer-siloxane-linked polymer, 3, which did not appear soluble in the FLC, but nevertheless suppressed zigzag formation and slightly enhanced bistability.

TABLE 5

Polymers with FLC mixtures

| Concentration (wt %) | Polymer | Spacer Type | Attachment Type | FLC Host | Zigzag Defects? | Line Defects? |
|---|---|---|---|---|---|---|
| Neat | / | / | / | MX40010 | Y | Y |
| 1.0% | 1 | Siloxane | Side-on | MX40010 | N | N |
| 0.5% | 1 | Siloxane | Side-on | MX40010 | Y | N |
| 1.0% | 5 | Siloxane | Side-on | MX40010 | N | Y |
| 1.0% | 4 | Thiol | End-on | MX40010 | N | Y |
| Neat | / | / | / | MX40013 | Y | Y |
| 1.0% | 1 | Siloxane | Side-on | MX40013 | a few | N |
| 0.50% | 1 | Siloxane | Side-on | MX40013 | a few | N |
| 1.0% | 5 | Siloxane | Side-on | MX40013 | N | Y |
| Neat | / | / | / | TM10000 | Y | Y |
| 1.5% | 1 | Siloxane | Side-on | TM10000 | N | Y |
| 1.5% | 4 | Thiol | End-on | TM10000 | N | N |

Diblock Copolymers

In addition to the aforementioned homopolymers, two sets of side-on diblock copolymers, and one triblock copolymer were examined. These block copolymers were much more sparingly soluble than the homopolymers, indeed, the triblock copolymer (having a side group liquid crystal polymer and two polystyrene end groups) could not dissolve in the FLC host at all. Diblock copolymers (having a side group liquid crystal polymer and one polystyrene end group) can dissolve in FLCs and, therefore are an aspect of the present invention. At a concentration of 1.5% of both diblocks, mixtures displayed no significant bistability, slightly slower or on par rise times, and lower tilt angles. Lower concentrations are preferred, particularly 0.5 wt % and below.

Although the diblocks spontaneously self assemble into nanoscale architecture in LCs, similar to most of the prior work on FLC stabilization, a head-to-head comparison with the homopolymer showed the homopolymer turned out to be more effective at suppressing zigzag defects and more soluble in the FLC. Thus, surprisingly, the greatest success was achieved with the simplest polymer architecture available Possible Mechanisms Based on polarized optical microscopy and the above electro-optic effects, it is suspected that as the system cools from the smectic A* phase to the smectic C* phase, Polymer 1 may be resisting the shearing deformation that occurs as chevrons form, kinetically hindering chevron formation and consequently encouraging the nucleation of new layers, a generally slower process. Assuming that the chevron state and the bookshelf state are roughly thermodynamically equal, kinetically favoring layer nucleation will lead to a permanent reorientation into bookshelf geometry.

On the other hand, although the end-on polymers 2, 3 and 4 appear to suppress zigzag defects, they show much less bistability enhancement. If these polymers are encouraging the FLC to relax into a single chevron direction, that would account for the general lack of zigzags and bistability.

Example 4

Electro-Optical Tests Using Polymer Additives and FLCs

The effects of three polymer additives (LCV20118, LCV20119, LCV20120 (LC Vision, Boulder, Colo., USA) in FLC mixture DNP-02 (also called LCV200-120) were studied. The structures of the additives is provided below:

| Compound Label | Structure |
|---|---|
| LCV20118 (also called 48kBB-Si) | |

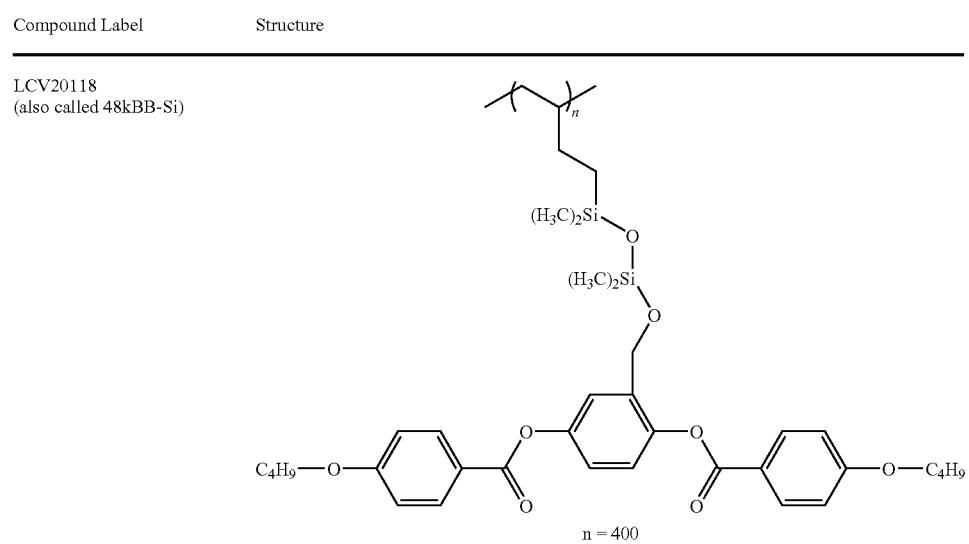

-continued

| Compound Label | Structure |
|---|---|
| LCV20119 (also called 120ABA-SiCV+ and also called FX10) | 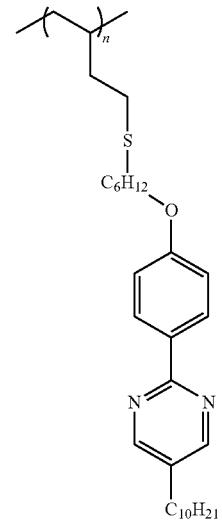<br>n = 880 |
| LCV20120 (also called 50(121)kBB) | 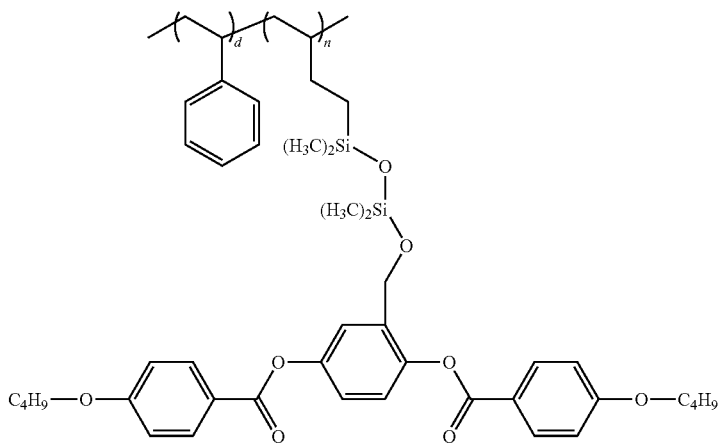<br>d = 1100; n = 900 |

Although FLC host mixture DNP-02 is significantly slower than standard host FLC mixtures directed at commercial display products, it serves as an excellent host for comparative examination of FLC additives. Concentrations of all polymer additives were made at 0.5% and 1.0 wt % each. Standard test cells were made with these FLC mixtures and their electro-optic (EO) characteristics, (Optical rise time vs. Voltage, and Light transmission vs. Voltage) were evaluated.

Upon examination of LCV20118, surprisingly, it was found that E-O performance was inversely proportional to its concentration. If voltage is kept fixed at, say 3.0 V, light transmission (throughput) is improved by 21%. If the concentration is reduced to 0.5%, the transmission goes up to by 29%. Response speed effect is even more pronounced. At 3 V, the FLC host switching speed is 1600 µs. Addition of 1% LCV20118 improves the rise time by 46% to 1100 µs. Reducing the concentration down to 0.5% improves the speed even further to 550 µs—a 2.9× increase when compared to the host mixture.

In the case of LCV20119, at 3 V, the light throughput at 1% is nearly the same as the FLC host. Halving the concentration to 0.5% improved the throughput by 31%. The rise time behavior is similar to LCV20118, with a 23% improvement to 1300 µs at 1%, and a further increase in switching speed to 700 µs (2.3×) at 0.5%.

Finally, addition of 1% LCV20120 reduces the light throughput by almost 3 fold. Amazingly, reducing the concentration to 0.5% reverses this trend, affording a 15% improvement in throughput. A similar trend is seen in the rise time of LCV20120. The rise time at 1% is slightly improved when compared to the host, at 1500 µs, while decreasing the dopant concentration to 0.5% dramatically improves the rise time by 2.7 fold to 600 µs.

Example 5

In an embodiment, the invention provides a method to reduce formation of zig zag defects in a ferroelectric liquid crystal (FLC), comprising: introducing a small amount of side group liquid crystal polymer (SGLCP) dopant into the FLC. In an embodiment, the amount of SGLCP dopant is about 1%. In an embodiment, the FLC host is shock cooled into a smectic C phase. In an embodiment, the SGLCP dopant is an end-on SGLCP polymer or a side-on SGLCP polymer. In an embodiment, the SGLCP dopant is side-on butoxybenzoate SGLCP. In an embodiment, the side-on butoxybenzoate SGLCP is introduced in a 1.5% amount. In an embodiment, provided is a ferroelectric liquid crystal (FLC) obtained with a method described herein. In an embodiment, a device comprising a FLC described herein is provided. In an embodiment, a display comprising a FLC described herein is provided. In an embodiment, provided is a polymer dopant for reducing formation of zig zag defects in a ferroelectric liquid crystal (FLC), the polymer dopant being a polymer dissolving in the FLC. In an embodiment, the polymer dopant is a side group liquid crystal polymer (SGLCP) as described herein.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

All possible ionic forms of molecules described herein and salts thereof are intended to be included individually in the disclosure herein.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, reagents, synthetic methods, purification methods, analytical methods, assay methods, and devices other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims. Any composition or compound that is claimed and that is described in the literature with an enabling disclosure is not intended to be included in the claims and it is intended that specific support is provided to exclude a compound or class of compounds from the claims.

The disclosures of the publications listed herein including the publications listed below are herein incorporated by reference in their entireties.

REFERENCES

1. Display Search, September 2007.
2. Shimada, T.; Kimura, M.: Kobayashi, S.; "Electro-optic bistability of ferroelectric liquid crystal cell prepared using obliquely evaporated sio films," Mol. Cryst. Liq. Cryst. 1991, 201, 133.
3. Yumiko Takahashi, Atsuo Iida, Yoichi Takanishi, Toyokazu Ogasawara, Michi Nakata, Ken Ishikawa, and Hideo Takezoe, "Dynamic local-layer response of surface-stabilized ferroelectric liquid crystals to a high electric field by time-resolved x-ray microdiffraction," Phys. Rev. E 2003, 67, 051706.
4. Rieker, T. P.; Clark, N. A.; Smith, G. S.; Parmar, D. S.; Sirota, E. B.; Safinya, C. R. "Chevron local layer structure in surface-stabilized ferroelectric smectic-C cells," Phys. Rev. Lett. 1987, 59, 2658-61.
5. Ajlun, C, "Stamp-Sized Ferroelectric LCD Can Power 50-in. TV Screens" Electronic Design, 2000, 48, 26.
6. Murashige, T; Fujikake, H; Sata, H; Kikuchi, H; Kurita, T; Sato, F; "Polymer Alignment Behavior with Molecular Switching of Ferroelectric Liquid Crystal, J. J. Apl. Phys. 2007, 46, 2, L37-J39.
7. Lee, K; Soo, S-W; Lee, S-D; "Fast linear electro-optical switching properties of polymer-dispersed ferroelectric liquid crystals." Applied Physics Letters, 1994, 64, 6, pp. 718-720, XP000422877.
8. Fujikake, H; Aida, T; Yonal, J; Kikuchi, H; Kawakita, M; Takizawa, K; "Rigid formation of aligned polymer fiber network in Ferrolelectric Liquid Crystal." J. J. Apl. Phys. 1999, 38, 1, 5212-5213.
9. Kempe, M. D.; Scruggs, N. R.; Verduzco, R.; Lal, J.; Kornfield, J. A.; "Self-assembled liquid crystalling gels designed from the bottom up," Nature Materials, 2004, 3, 177.
10. Shimada, T.; Kimura, M.: Kobayashi, S.; "Electro-optic bistability of ferroelectric liquid crystal cell prepared using obliquely evaporated sio films," Mol. Cryst. Liq. Cryst. 1991, 201, 133.
11. McConnell, G. A.; Gast, A. P. "Melting of ordered arrays and shape transitions in highly concentrated diblock copolymer solutions," Macromolecules 1997, 30, 435.
12. Yumiko Takahashi, Atsuo Iida, Yoichi Takanishi, Toyokazu Ogasawara, Michi Nakata, Ken Ishikawa, and Hideo Takezoe, Dynamic local-layer response of surface-stabilized ferroelectric liquid crystals to a high electric field by time-resolved x-ray microdiffraction, Phys. Rev. E 2003, 67, 051706.
13. Kempe, M; Kornfield, J. A.; "Shear alignment behavior of nematic solutions induced by ultralong sidegroup liquid crystal polymers," Phys. Rev. Let. 2003, 90, 11.
14. Kempe, M. Rheology and dynamics of side-group liquid crystalline polymers in nematic solvents [Ph.D Thesis]. Pasadena: California Institute of Technology, 2003, Jun. 9; available from: http://etd.caltech.edu.clsproxy.library-.caltech.edu/etd/available/etd-07202003-103429/.
15. Zhao, Y.; Jamieson, A. M.; Olsen, B. G; et al., "Conformation of comb-like liquid crystal polymers in isotropic solution probed by small-angle neutron scattering: J. of Pol. Sci.: Part B: Polymer Physics 2006, 44, 17, 2412-2424.
16. Marčelja, S, "Chain ordering in liquid crystals. I. Even-odd effect" J. Chem. Phys. 1974, 60, 9, 3599.
17. David, R. L. A; Kornfield. J. A., "Facile, efficient routes to diverse protected thiols and to their deprotection and addition to create functional polymers by thiol-ene coupling," Macromolecules; 2008, 41, 4, 1151-1161.
18. Kempe, Nature Materials, 2004, 3, 177-182.
19. Palffy-Muhoray, Nature Materials, 2004, 3, 139-140.
20. Xia, JACS, 2009, 131, 18525-18532.
21. Lee, Appl. Phys. Lett, 1994, 64, 718

U.S. Pat. Nos. 6,821,455, 7,008,675, 7,179,509, 4,904,066, 5,313,320, 4,896,292, 5,422,036, 6,132,819, 6,583,838, 5,321,533, 6,133,975, 5,138,010, 5,397,503.
JP 02116824A
GB02274652A
PCT99/32576

We claim:

1. A ferroelectric liquid crystal composition, comprising: a ferroelectric liquid crystal host; and between 0.01 and 5 wt % of a side group liquid crystal polymer, wherein the side group liquid crystal polymer is polymerized and purified prior to introduction into the ferroelectric liquid crystal host, is not crosslinked and has the structure (FX1):

wherein PX is a polymer; W is a spacer; and LC is a liquid crystal, wherein the side group liquid crystal polymer is soluble in the ferroelectric liquid crystal host at a temperature at which the ferroelectric liquid crystal host is ferroelectric.

2. The ferroelectric liquid crystal composition of claim 1, wherein the side group liquid crystal polymer has the structure (FX2):

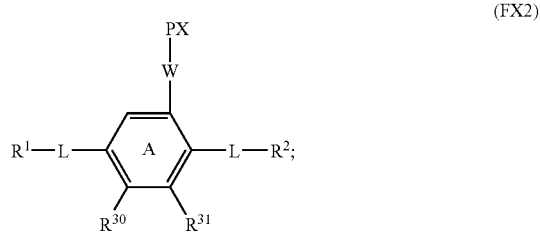

wherein PX is

$[-(CH_2-CH-S)_n-]$, $[-(NH-CH-C(=O))_n-]$, $[-(-C(=O)-N-C(=O))_n-]$, $[-(Si(CH_2)-O)_n-]$, $[-(CH_2-CH(C(O)=O)_n-]$, $[-(CH_2-C(CH_3)(C(O)=O)_n-]$, $[-(CH_2CH)_n-]$, $[-(CH(CH_2CH_2))_n-]$ or $[-(CH_2-CH(CH_2CH_2))_n-]$ where in each PX n is independently an integer between 50 to 10000;

W is $-(O)_b-(CR^{13}R^{14})_x-(O)_b-FX-(O)_b-(CR^{15}R^{16})_y-(O)_b-$, where x and y are each independently integers from 0 to 20;

FX is a spacer selected from $-S-$, $-S(=O)-$, $-O-$, $-C(=O)-$,

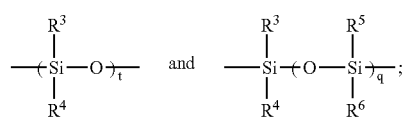

where q is an integer from 0 to 10;

t is an integer from 1 to 10;
each b is independently 0 or 1; and
R$^3$, R$^4$, R$^5$ and R$^6$ are each independently selected from optionally substituted C$_1$-C$_6$ alkyl, where the optional substituents are one or more halogens;
R$^{13}$, R$^{14}$, R$^{15}$ and R$^{16}$ are each independently hydrogen or halogen;
each L is independently selected from: —O—C(═O)—, —C(═O)—O—, —C═C—, —C≡C—, —(CH$_2$)$_u$—; and a single bond; where u is an integer from 1 to 10;
R$^1$ and R$^2$ are each independently selected from:

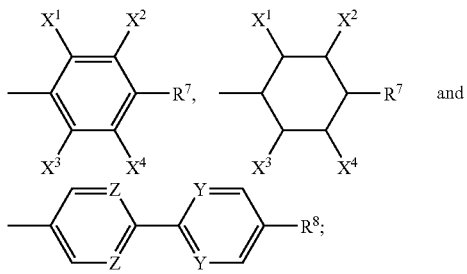

where X$^1$, X$^2$, X$^3$ and X$^4$ are independently hydrogen, halogen, methoxy, C$_1$-C$_3$ alkyl or —CN; where (a) each Z and each Y is CH, or (b) each Z is N and each Y is CH, or (c) each Y is N and each Z is CH;
R$^7$ and R$^8$ are each independently hydrogen, halogen, and —(O)$_v$—(CH$_2$)$_p$—CH$_3$ where p is an integer from 0 to 20 and v is 0 or 1;
R$^{30}$ and R$^{31}$ are each independently hydrogen or halogen.

3. The ferroelectric liquid crystal composition of claim 1, wherein in the side group liquid crystal polymer PX is a polymer having the formula:

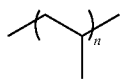

where n is an integer from 50 to 10,000.

4. The ferroelectric liquid crystal composition of claim 2, wherein in the side group liquid crystal polymer each L is independently selected from:
—O—C(═O)—, —C(═O)—O—, —(CH$_2$)$_u$—; and a single bond; where u is an integer from 1 to 10;

W is —(CH$_2$)$_x$—FX—(CH$_2$)$_y$—; x and y are each independently integers from 0 to 20;
FX is a spacer selected from —S—,

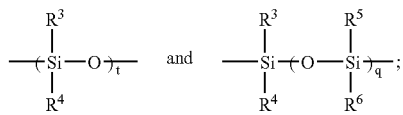

where q is an integer from 0 to 10;
where t is an integer from 1 to 10;
R$^3$, R$^4$, R$^5$ and R$^6$ are each independently selected from hydrogen and C1-C6 alkyl;
PX is a polymer having the structure:

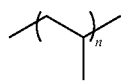

where n is an integer from 50 to 10,000;
R$^1$ and R$^2$ are each independently selected from:

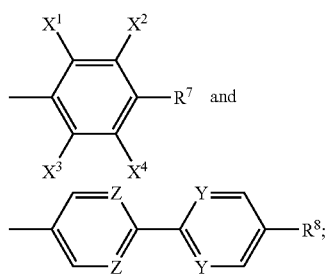

where X$^1$, X$^2$, X$^3$ and X$^4$ are independently hydrogen, halogen or —CN; where (a) each Z and each Y is CH, or (b) each Z is N and each Y is CH, or (c) each Y is N and each Z is CH;
R$^7$ and R$^8$ are independently —(O)$_v$—(CH$_2$)$_p$—CH$_3$ where p is an integer from 0 to 20;
v is 0 or 1; and
R$^{30}$ and R$^{31}$ are each independently hydrogen or halogen.

5. The ferroelectric liquid crystal composition of claim 1, wherein the side group liquid crystal polymer has the structure (FX3):

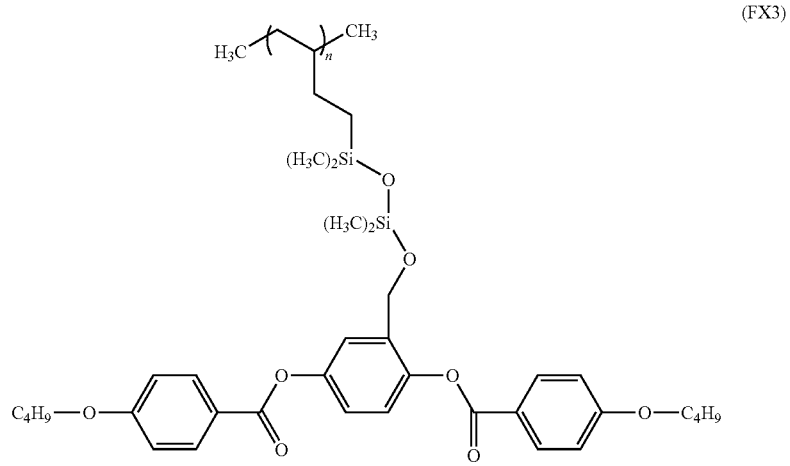

where n is an integer from 200 to 1,000.

6. The ferroelectric liquid crystal composition of claim 1, wherein the side group liquid crystal polymer has the structure (FX4):

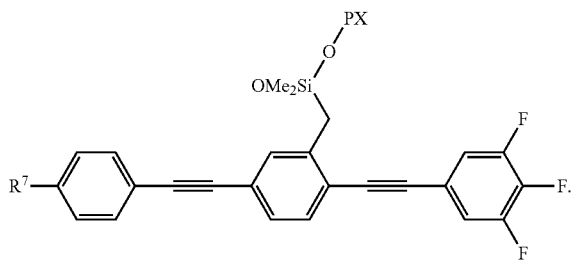
(FX4)

7. The ferroelectric liquid crystal composition of claim 2, wherein in the side group liquid crystal polymer,
when L-R$^2$ is

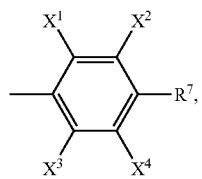

X$^3$ and R$^{31}$, along with the carbon atoms on the rings to which they are attached, form a five-membered ring, so that LC has the structure:

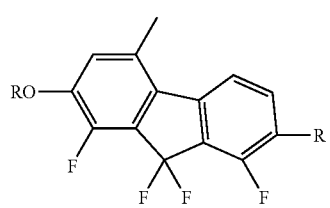

where each R is independently C1-C6 alkyl.

8. The ferroelectric liquid crystal composition of claim 1, wherein in the side group liquid crystal polymer, LC has the structure

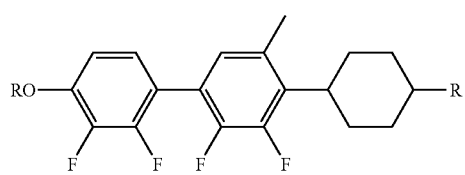

where each R is independently a C1-C6 alkyl.

9. The ferroelectric liquid crystal composition of claim 1, wherein in the side group liquid crystal polymer, LC has the structure (FX5a), (FX6a), (FX7a) or (FX8a):

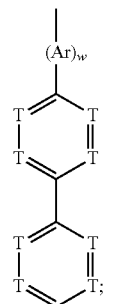
(FX5a)

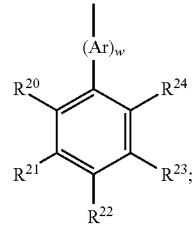
(FX6a)

(FX7a)
$\overset{|}{\text{RG}}$;

(FX8a)

where Ar is selected from phenyl, pyrimidine, pyridine, and cyclohexyl having an optional O or S heteroatom in the ring;

w is an integer from 0 to 3;

R$^{20}$, R$^{21}$, R$^{22}$, R$^{23}$ and R$^{24}$ are each independently

—H, —F, —Cl, —Br, —CN, —CF$_3$, —OCF$_3$, —OCH$_3$, C1-C6 optionally substituted alkyl where the optional substituents are one or more halogens, and C1-C6 alkoxy;

RG is selected from the group consisting of:

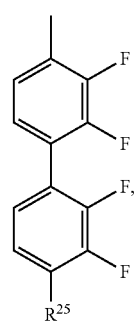 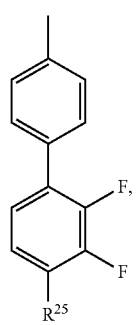 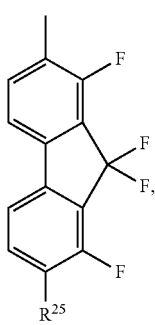

-continued

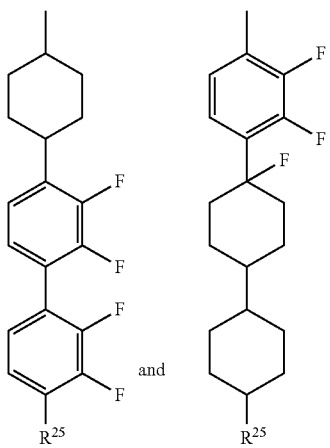

where R²⁵ is C1-C6 alkyl or C1-C6 alkoxy;
PX is

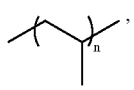

[—(CH₂—CH—S)ₙ—], [—(NH—CH—C(=O))ₙ—], [—(—C(=O)—N—C(=O))ₙ—], [—(Si(CH₂)—O)ₙ—], [—(CH₂—CH(C(O)=O)ₙ—], [—(CH₂—C(CH₃)(C(O)=O)ₙ—], [—(CH₂CH)ₙ—], [—(CH(CH₂CH₂))ₙ—] or [—(CH₂—CH(CH₂CH₂))ₙ—] where in each PX n is independently an integer between 50 to 10000;

W is —(O)$_b$—(CR¹³R¹⁴)$_x$—(O)$_b$—FX—(O)$_b$—(CR¹⁵R¹⁶)$_y$—(O)$_b$—, where x and y are each independently integers from 0 to 20;

FX is a spacer selected from —S—, —S(=O)—, —O—, —C(=O)—,

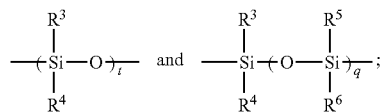

where q is an integer from 0 to 10;
t is an integer from 1 to 10;
each b is independently 0 or 1; and
R³, R⁴, R⁵ and R⁶ are each independently selected from optionally substituted C₁-C₆ alkyl, where the optional substituents are one or more halogens;
R¹³, R¹⁴, R¹⁵ and R¹⁶ are each independently hydrogen or halogen;
R²⁷ is C1-C20 alkyl, C1-C20 alkoxy, -Q(CH₂)$_f$(CF₂)$_g$CF₃ or -Q(CH₂)$_f$(SiMe₂)(CH₂)$_g$(CF₂)$_g$CF₃;
where Q is O, S, CO, CO₂ or a single bond;
each f and g are independently integers from 0 to 10;
each T is independently CH or N;
where when T is CH, T is optionally substituted with halogen, —CF₃, —OCF₃, —CN, —OCH₃ or —CH₃;

R² is selected from:

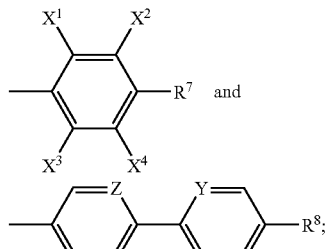

where X¹, X², X³ and X⁴ are independently H or halogen; where (a) each Z and each Y is CH, or (b) each Z is N and each Y is CH, or (c) each Y is N and each Z is CH;
R⁷ and R⁸ are independently —(O)$_v$—(CH₂)$_p$—CH₃ where p is an integer from 0 to 20 and v is 0 or 1;
R⁹ is

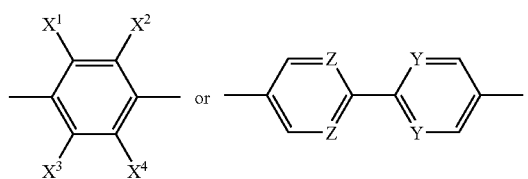

where X¹, X², X³ and X⁴ are independently H or halogen; where (a) each Z and each Y is CH, or (b) each Z is N and each Y is CH, or (c) each Y is N and each Z is CH; and each L is independently selected from: —O—C(=O)—, —C(=O)—O—, —C=C—, —C≡C—, —(CH₂)$_u$—; and a single bond; where u is an integer from 1 to 10.

10. The ferroelectric liquid crystal composition of claim 9, wherein the side group liquid crystal polymer has the structure (FX9), (FX10) or (FX9A):

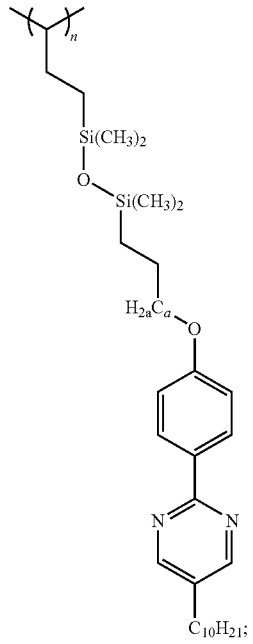

-continued

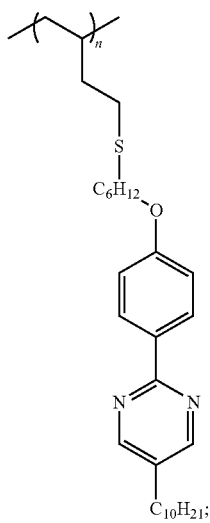
(FX10)

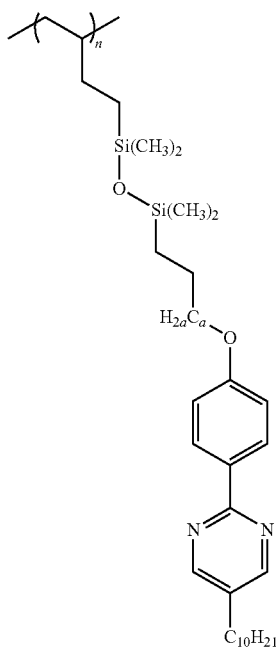
(FX9A)

where n is an integer from 500 to 1,000 and a is an integer from 5 to 9.

11. The ferroelectric liquid crystal composition of claim 9, wherein in the side-group liquid crystal polymer, PX is a polymer having the structure:

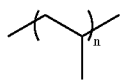

where n is an integer from 50 to 10,000.

12. An optical device comprising:
two opposing electrode surfaces;
the ferroelectric liquid crystal composition of claim 1 disposed therebetween, wherein the optical device has improved contrast as compared to an optical device containing no side group liquid crystal polymer.

13. A method of preparing a ferroelectric liquid crystal composition, comprising:
contacting a ferroelectric liquid crystal host with between 0.01 and 5 wt % of a side group liquid crystal polymer which is soluble in the ferroelectric liquid crystal host at a temperature at which the ferroelectric liquid crystal host is ferroelectric; wherein the side group liquid crystal polymer is polymerized and purified prior to contacting the ferrorelectric liquid crystal host and is not crosslinked; wherein the side group liquid crystal polymer has the structure (FX1):

$$PX-W-LC$$ (FX1)

wherein PX is a polymer; W is a spacer; and LC is a liquid crystal ferroelectric.

14. A ferroelectric liquid crystal composition, comprising:
a ferroelectric liquid crystal host; and between 0.01 and 5 wt % of a side group liquid crystal polymer, wherein the side group liquid crystal polymer is polymerized and purified prior to introduction into the ferroelectric liquid crystal host, is not crosslinked and has the structure (FX2):

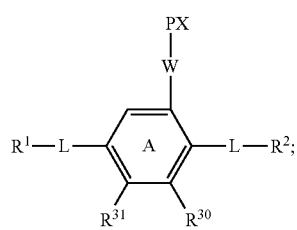
(FX2)

wherein PX is

where n is independently an integer between 50 to 10000;
W is $-(O)_b-(CR^{13}R^{14})_x-(O)_b-FX-(O)_b-(CR^{15}R^{16})_y-(O)_b-$, where x and y are each independently integers from 0 to 20;
FX is a spacer selected from $-O-$, $-C(=O)-$,

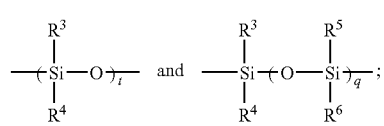

where q is an integer from 0 to 10;
t is an integer from 1 to 10;
each b is independently 0 or 1; and
$R^3$, $R^4$, $R^5$ and $R^6$ are each independently selected from optionally substituted $C_1$-$C_6$ alkyl, where the optional substituents are one or more halogens;
$R^{13}$, $R^{14}$, $R^{15}$ and $R^{16}$ are each independently hydrogen or halogen;

each L is independently selected from: —O—C(=O)—, —C(=O)—O—, —(CH$_2$)$_u$—; and a single bond; where u is an integer from 1 to 10;

R$^1$ and R$^2$ are each independently:

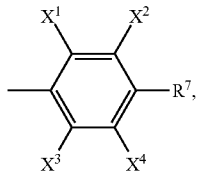

where X$^1$, X$^2$, X$^3$ and X$^4$ are independently hydrogen, halogen, methoxy, C$_1$-C$_3$ alkyl or —CN;

R$^7$ is each independently hydrogen, halogen, and —(O)$_v$—(CH$_2$)$_p$—CH$_3$ where p is an integer from 0 to 20 and v is 0 or 1;

R$^{30}$ and R$^{31}$ are each independently hydrogen or halogen, wherein the side group liquid crystal polymer is soluble in the ferroelectric liquid crystal host at a temperature at which the ferroelectric liquid crystal host is ferroelectric.

15. The ferroelectric liquid crystal composition of claim 2, wherein the side group liquid crystal polymer has one of the structures:

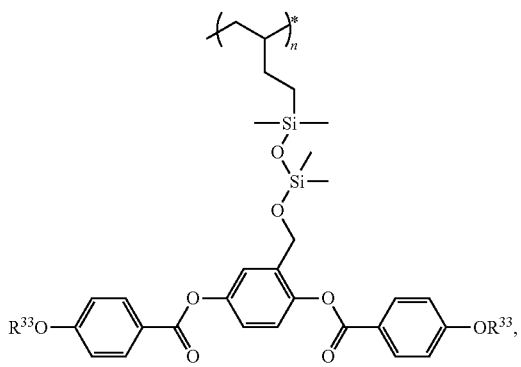

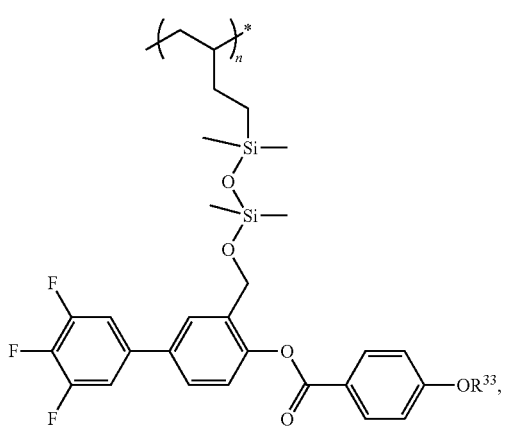

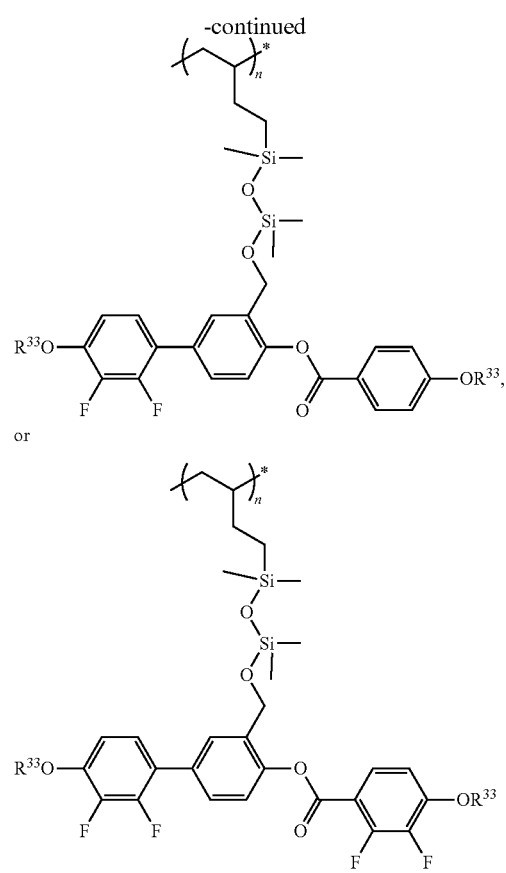

where n is an integer from 50 to 10000 and each R$^{33}$ is independently an alkyl group having from 4 to 10 carbon atoms.

16. A ferroelectric liquid crystal composition, comprising: a ferroelectric liquid crystal host; and between 0.01 and 5 wt % of a side group liquid crystal polymer, wherein the side group liquid crystal polymer is not crosslinked and has the structure (FX2):

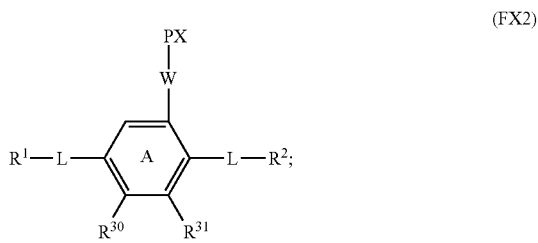

(FX2)

wherein PX is

[—(Si(CH$_2$)—O)$_n$—], [—(CH$_2$—CH(C(O)=O)$_n$—], [—(CH$_2$—C(CH$_3$)(C(O)=O)$_n$—], where n is independently an integer between 50 to 10000;

W is —(O)$_b$—(CR$^{13}$R$^{14}$)$_x$—(O)$_b$—FX—(O)$_b$—(CR$^{15}$R$^{16}$)$_y$—(O)$_b$—, where x and y are each independently integers from 0 to 20;

FX is a spacer selected from —O—, —C(=O)—,

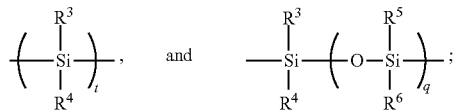

where q is an integer from 0 to 10;
t is an integer from 1 to 10;
each b is independently 0 or 1; and
R³, R⁴, R⁵ and R⁶ are each independently selected from optionally substituted $C_1$-$C_6$ alkyl, where the optional substituents are one or more halogens;
R¹³, R¹⁴, R¹⁵ and R¹⁶ are each independently hydrogen or halogen;
each L is independently selected from: —O—C(=O)—, —C(=O)—O—, —(CH₂)$_u$—; and a single bond; where u is an integer from 1 to 10;

R¹ and R² are each independently:

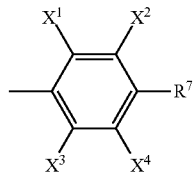

where X¹, X², X³ and X⁴ are independently hydrogen, halogen, methoxy, $C_1$-$C_3$ alkyl or —CN;
R⁷ is each independently hydrogen, halogen, and —(O)$_v$—(CH₂)$_p$—CH₃ where p is an integer from 0 to 20 and v is 0 or 1;
R³⁰ and R³¹ are each independently hydrogen or halogen, wherein the side group liquid crystal polymer is soluble in the ferroelectric liquid crystal host at a temperature at which the ferroelectric liquid crystal host is ferroelectric.

\* \* \* \* \*